US012538031B2

(12) United States Patent
Fujikawa et al.

(10) Patent No.: US 12,538,031 B2
(45) Date of Patent: Jan. 27, 2026

(54) CONTROL DEVICE, CONTROL METHOD, AND CONTROL PROGRAM

(71) Applicant: FUJIFILM Corporation, Tokyo (JP)

(72) Inventors: Tetsuya Fujikawa, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 55 days.

(21) Appl. No.: 18/736,540

(22) Filed: Jun. 7, 2024

(65) Prior Publication Data
US 2024/0323536 A1 Sep. 26, 2024

Related U.S. Application Data

(63) Continuation of application No. PCT/JP2022/045121, filed on Dec. 7, 2022.

(30) Foreign Application Priority Data

Dec. 23, 2021 (JP) .................. 2021-209514

(51) Int. Cl.
*H04N 23/695* (2023.01)
*H04N 7/18* (2006.01)
(Continued)

(52) U.S. Cl.
CPC .......... *H04N 23/695* (2023.01); *H04N 7/183* (2013.01); *H04N 23/66* (2023.01);
(Continued)

(58) Field of Classification Search
CPC ........ H04N 7/18; H04N 7/183; H04N 23/695; H04N 23/66; H04N 23/60; H04N 23/6812; H04N 23/683; H04N 23/687
(Continued)

(56) References Cited

U.S. PATENT DOCUMENTS 6,430,471 B1 * 8/2002 Kintou .................... H04L 67/12
473/588
6,977,678 B1 12/2005 Wada et al.
(Continued)

FOREIGN PATENT DOCUMENTS

CN 110691197 1/2020
JP H08139987 5/1996
(Continued)

OTHER PUBLICATIONS

"International Search Report (Form PCT/ISA/210) of PCT/JP2022/045121", mailed on Mar. 7, 2023, with English translation thereof, pp. 1-7.
(Continued)

*Primary Examiner* — Pritham D Prabhakher
(74) *Attorney, Agent, or Firm* — JCIPRNET

(57) ABSTRACT

A control device controls a revolution mechanism causing an imaging apparatus to revolve. The control device includes a processor. The processor is configured to switch between first control and second control that are related to an operation of the revolution mechanism based on at least any one of an imaging condition of the imaging apparatus or operating information of the revolution mechanism, the first control is continuous control in which an input factor is a command value of a speed, and the second control is discrete control in which the input factor is a command value of a position.

18 Claims, 18 Drawing Sheets

(51) Int. Cl.
  *H04N 23/66* (2023.01)
  *H04N 23/68* (2023.01)
(52) U.S. Cl.
  CPC ....... *H04N 23/6812* (2023.01); *H04N 23/683* (2023.01); *H04N 23/687* (2023.01)
(58) Field of Classification Search
  USPC .................................................... 348/208.99
  See application file for complete search history.

(56) References Cited

U.S. PATENT DOCUMENTS

| | | | | |
|---|---|---|---|---|
| 7,623,181 | B2 * | 11/2009 | Ibaraki | F16M 11/2092 248/371 |
| 7,747,153 | B2 * | 6/2010 | Ibaraki | H04N 23/6815 396/55 |
| 8,221,008 | B2 * | 7/2012 | Kimura | F16M 11/18 396/428 |
| 10,356,301 | B2 * | 7/2019 | Oshima | H04N 23/66 |
| 10,484,608 | B2 * | 11/2019 | Wakamatsu | H04N 23/60 |
| 10,572,143 | B2 * | 2/2020 | Irie | G03B 17/18 |
| 11,949,982 | B2 * | 4/2024 | Geissler | H04N 5/2628 |
| 2004/0223062 | A1 * | 11/2004 | Pettegrew | F16M 11/18 348/208.99 |
| 2007/0019106 | A1 * | 1/2007 | Ibaraki | F16M 11/10 348/373 |
| 2008/0260369 | A1 | 10/2008 | Ibaraki | |
| 2014/0204230 | A1 * | 7/2014 | Boyle | G06F 3/011 348/211.99 |
| 2017/0019106 | A1 * | 1/2017 | Akahane | H03K 17/162 |
| 2018/0295270 | A1 * | 10/2018 | Oshima | H04N 23/6811 |
| 2018/0316865 | A1 * | 11/2018 | Wakamatsu | H04N 23/6812 |
| 2022/0109788 | A1 * | 4/2022 | Geissler | H04N 23/661 |

FOREIGN PATENT DOCUMENTS

| | | |
|---|---|---|
| JP | 2001069496 | 3/2001 |
| JP | 2003283879 | 10/2003 |
| JP | 2008268505 | 11/2008 |
| JP | 2010177801 | 8/2010 |
| JP | 2010288012 | 12/2010 |
| JP | 2011249869 | 12/2011 |
| JP | 2014216692 | 11/2014 |
| JP | 2020136981 | 8/2020 |

OTHER PUBLICATIONS

"Written Opinion of the International Searching Authority (Form PCT/ISA/237) of PCT/JP2022/045121", mailed on Mar. 7, 2023, with English translation thereof, pp. 1-12.

* cited by examiner

CONTROL DEVICE, CONTROL METHOD, AND CONTROL PROGRAM

CROSS REFERENCE TO RELATED APPLICATION

This is a continuation of International Application No. PCT/JP2022/045121 filed on Dec. 7, 2022, and claims priority from Japanese Patent Application No. 2021-209514 filed on Dec. 23, 2021, the entire disclosures of which are incorporated herein by reference.

BACKGROUND OF THE INVENTION

1. Field of the Invention

The present invention relates to a control device, a control method, and a computer-readable medium storing a control program.

2. Description of the Related Art

JP1996-139987A (JP-H08-139987A) discloses a pan tilt camera in which a pan mechanism and a tilt mechanism are driven at a first movement speed in a case where a camera body is moved toward a position where a movement target position is set in advance, and the pan mechanism and the tilt mechanism are driven at a second movement speed, which is slower than the first movement speed, in a case where the camera body is moved in a state where the movement target position is not set in advance or in a case where the camera body is moved manually.

JP2001-69496A discloses a surveillance camera apparatus in which coordinates of a movement destination of a camera are input by using a joystick, a tablet, or the like to perform position control and speed control of pan rotation and tilt rotation of the camera.

SUMMARY OF THE INVENTION

One embodiment according to the technique of the present disclosure provides a control device, a control method, and a computer-readable medium storing a control program capable of causing an imaging apparatus to revolve at an appropriate speed in accordance with a situation.

A control device according to one aspect of the present invention is a control device that controls a revolution mechanism causing an imaging apparatus to revolve, the control device comprising a processor, in which the processor is configured to switch between first control and second control related to an operation of the revolution mechanism based on at least any one of an imaging condition of the imaging apparatus or operating information of the revolution mechanism, and the first control and the second control have different input factors for control.

Further, a control device according to one aspect of the present invention is a control device that controls a revolution mechanism causing an imaging apparatus to revolve, the control device comprising a processor, in which the processor is configured to switch between first control and second control related to an operation of the revolution mechanism based on at least any one of an imaging condition of the imaging apparatus or operating information of the revolution mechanism, and the second control enables the revolution at a lower speed than in the first control.

A control method according to one aspect of the present invention, which is executed by a processor of a control device that controls a revolution mechanism causing an imaging apparatus to revolve, comprises switching between first control and second control related to an operation of the revolution mechanism based on at least any one of an imaging condition of the imaging apparatus or operating information of the revolution mechanism, in which the first control and the second control have different input factors for control.

A computer-readable medium storing a control program according to one aspect of the present invention that causes a processor of a control device, which controls a revolution mechanism causing an imaging apparatus to revolve, to execute a process comprises switching between first control and second control related to an operation of the revolution mechanism based on at least any one of an imaging condition of the imaging apparatus or operating information of the revolution mechanism, in which the first control and the second control have different input factors for control.

According to the present invention, it is possible to provide the control device, the control method, and the computer-readable medium storing the control program capable of causing the imaging apparatus to revolve at an appropriate speed in accordance with a situation.

BRIEF DESCRIPTION OF THE DRAWINGS

FIG. 6 is a diagram showing an example of a captured image displayed on a display 13a.

DESCRIPTION OF THE PREFERRED EMBODIMENTS

Hereinafter, an example of an embodiment of the present invention will be described with reference to drawings.

Imaging System of Embodiment

Figure 1:
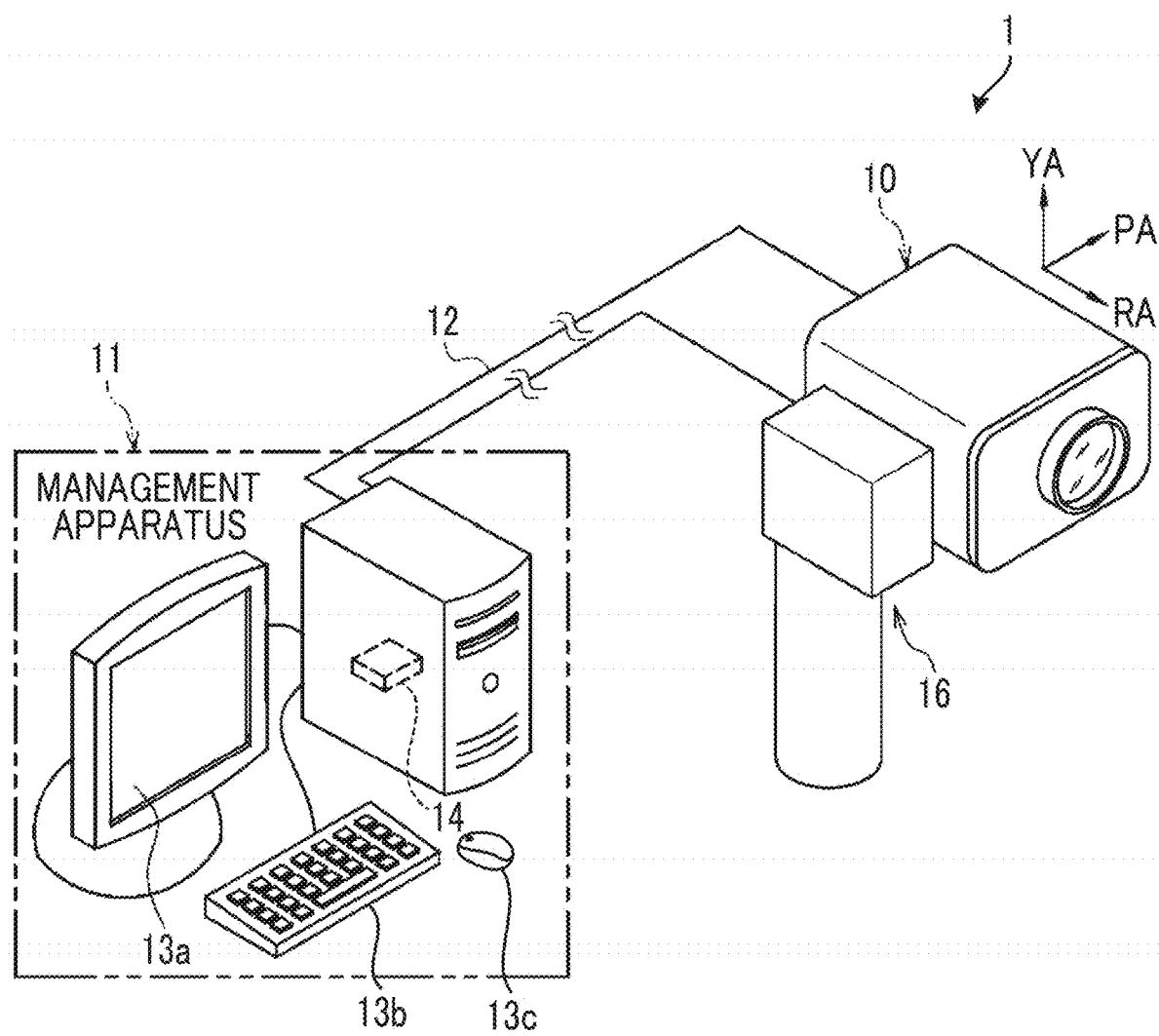
FIG. 1 is a diagram showing an example of an imaging system 1 equipped with a management apparatus 11 of the present embodiment.

FIG. 1 is a diagram showing an example of an imaging system 1 equipped with a control device of the present embodiment. As shown in FIG. 1 as an example, the imaging system 1 includes a surveillance camera 10 and a management apparatus 11. The surveillance camera 10 is an example of an imaging apparatus according to the embodiment of the present invention. The management apparatus 11 is an example of the control device according to the embodiment of the present invention.

The surveillance camera 10 is installed in an indoor or outdoor post or wall, a part (for example, rooftop) of a building, or the like, via a revolution mechanism 16 described below, to capture an imaging target that is a subject. The surveillance camera 10 transmits, to the management apparatus 11 via a communication line 12, a captured image obtained by the capturing and imaging information related to the capturing of the captured image.

The management apparatus 11 comprises a display 13a, a keyboard 13b, a mouse 13c, and a secondary storage device 14. Examples of the display 13a include a liquid crystal display, a plasma display, an organic electro-luminescence (EL) display, and a cathode ray tube (CRT) display.

An example of the secondary storage device 14 includes a hard disk drive (HDD). The secondary storage device 14 is not limited to the HDD, and may be a non-volatile memory such as a flash memory, a solid state drive (SSD), or an electrically erasable and programmable read only memory (EEPROM).

The management apparatus 11 receives the captured image or the imaging information, which is transmitted from the surveillance camera 10, and displays the received captured image or imaging information on the display 13a or stores the received captured image or imaging information in the secondary storage device 14.

The management apparatus 11 performs imaging control of controlling the imaging performed by the surveillance camera 10. For example, the management apparatus 11 communicates with the surveillance camera 10 via the communication line 12 to perform the imaging control. The imaging control is to set, to the surveillance camera 10, an imaging parameter for the imaging performed by the surveillance camera 10 and to cause the surveillance camera 10 to execute the imaging. For example, an example of the imaging control includes an operation of the keyboard 13b or the mouse 13c or a touch operation on a screen of the display 13a to set a revolution direction, a revolution speed, and the like of the surveillance camera 10.

Revolution of Surveillance Camera 10 by Revolution Mechanism 16

Figure 2:
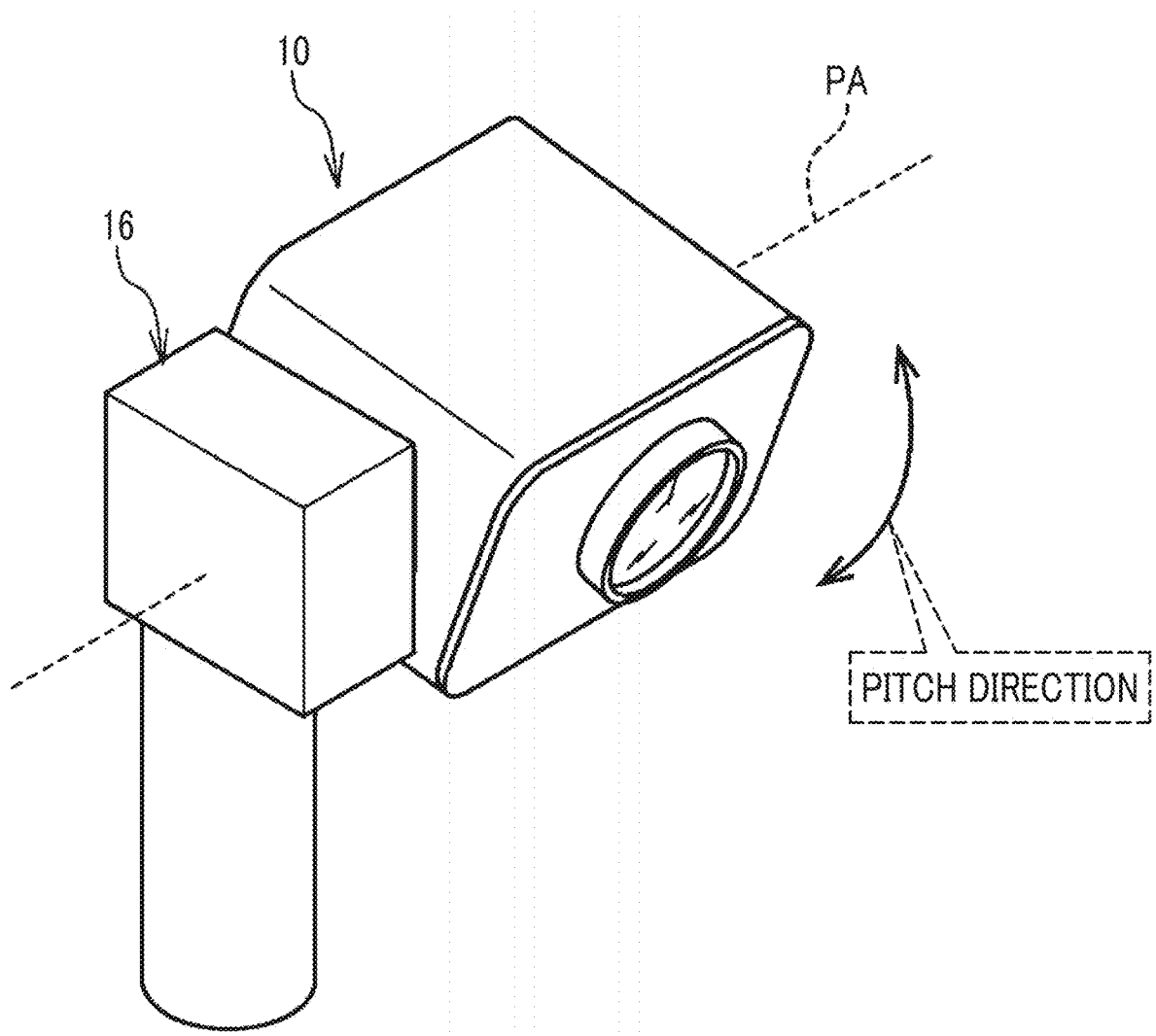
FIG. 2 is a diagram showing an example of revolution of a surveillance camera 10 in a pitch direction by a revolution mechanism 16.
Figure 3:
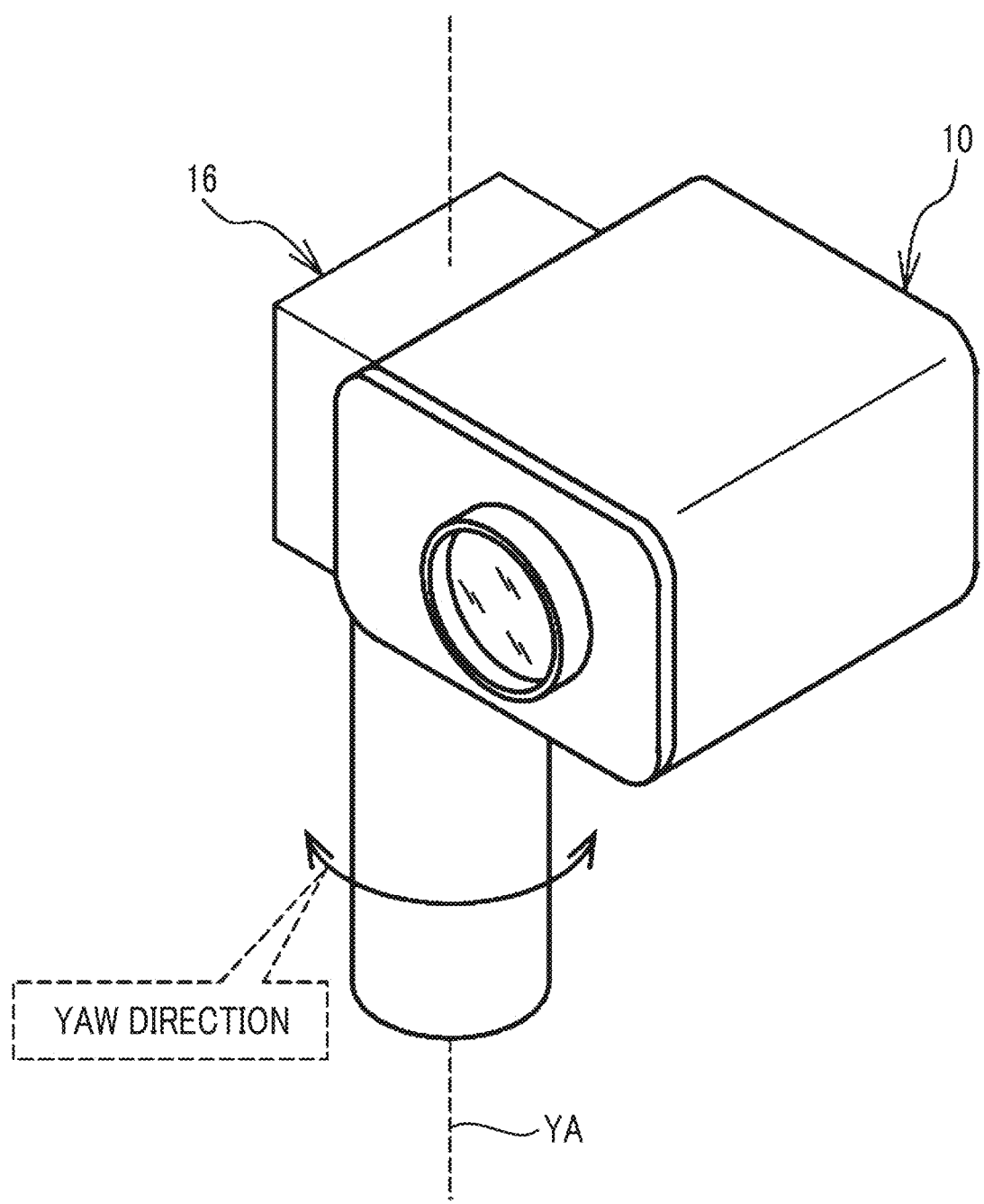
FIG. 3 is a diagram showing an example of the revolution of the surveillance camera 10 in a yaw direction by the revolution mechanism 16.

FIG. 2 is a diagram showing an example of revolution of the surveillance camera 10 in a pitch direction by the revolution mechanism 16. FIG. 3 is a diagram showing an example of the revolution of the surveillance camera 10 in a yaw direction by the revolution mechanism 16. The surveillance camera 10 is attached to the revolution mechanism 16. The revolution mechanism 16 enables the surveillance camera 10 to revolve.

Specifically, the revolution mechanism 16 is a two-axis revolution mechanism that enables the surveillance camera 10 to revolve in a revolution direction (pitch direction) that intersects the yaw direction and that has a pitch axis PA as a central axis, as shown in FIG. 2 as an example, and in a revolution direction (yaw direction) that has a yaw axis YA as a central axis, as shown in FIG. 3 as an example. An example is shown in which the two-axis revolution mechanism is used as the revolution mechanism 16 according to the present embodiment, but the technique of the present disclosure is not limited thereto. A three-axis revolution mechanism or a one-axis revolution mechanism may be used.

Configuration of Optical System and Electrical System of Surveillance Camera 10

Figure 4:
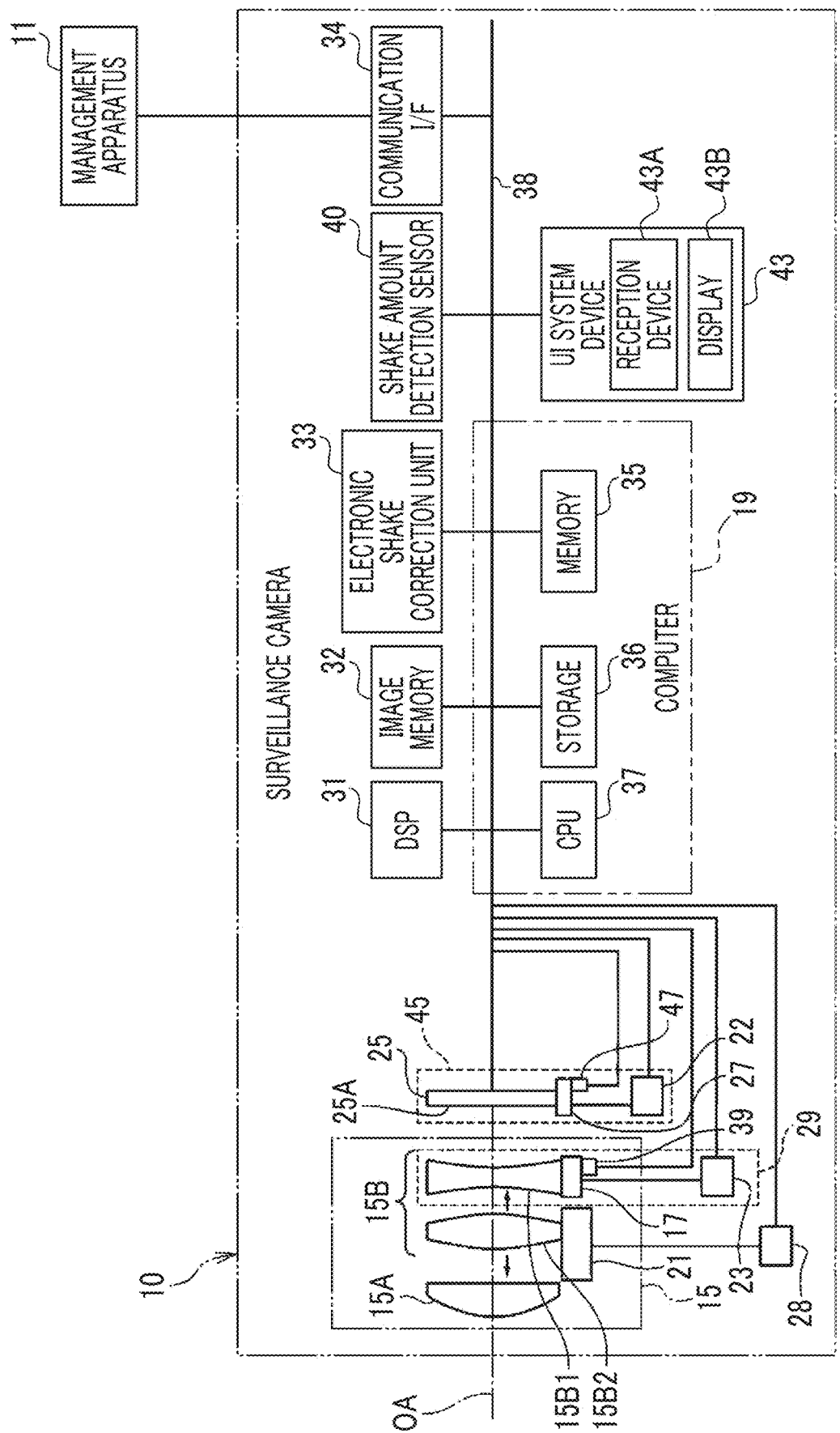
FIG. 4 is a block diagram showing an example of a configuration of an optical system and an electrical system of the surveillance camera 10.

FIG. 4 is a block diagram showing an example of a configuration of an optical system and an electrical system of the surveillance camera 10. As shown in FIG. 4 as an example, the surveillance camera 10 comprises an optical system 15 and an imaging element 25. The imaging element 25 is located after the optical system 15. The optical system 15 comprises an objective lens 15A and a lens group 15B. The objective lens 15A and the lens group 15B are disposed, along an optical axis OA of the optical system 15, over a light-receiving surface 25A side (image side) of the imaging element 25 from a target subject side (object side) in an order of the objective lens 15A and the lens group 15B. The lens group 15B includes an anti-vibration lens 15B1, a focus lens (not illustrated), a zoom lens 15B2, and the like. The zoom lens 15B2 is movably supported along the optical axis OA by a lens actuator 21 described below. The anti-vibration lens 15B1 is movably supported in a direction orthogonal to the optical axis OA by a lens actuator 17 described below.

An increase in a focal length by the zoom lens 15B2 sets the surveillance camera 10 on a telephoto side, and thus an angle of view is decreased (imaging range is narrowed). A decrease in the focal length by the zoom lens 15B2 sets the surveillance camera 10 on a wide angle side, and thus the angle of view is increased (imaging range is widened).

Various lenses (not illustrated) may be provided as the optical system 15 in addition to the objective lens 15A and the lens group 15B. Furthermore, the optical system 15 may comprise a stop. Positions of the lenses, the lens group, and the stop included in the optical system 15 are not limited. For example, the technique of the present disclosure is also effective for positions different from the positions shown in FIG. 4.

The anti-vibration lens 15B1 is movable in a direction perpendicular to the optical axis OA, and the zoom lens 15B2 is movable along the optical axis OA.

The optical system 15 comprises the lens actuators 17 and 21. The lens actuator 17 causes force that fluctuates in a direction perpendicular to an optical axis of the anti-vibration lens 15B1 to act on the anti-vibration lens 15B1. The lens actuator 17 is controlled by an optical image stabilizer (OIS) driver 23. With the drive of the lens actuator 17 under the control of the OIS driver 23, the position of the anti-vibration lens 15B1 fluctuates in the direction perpendicular to the optical axis OA.

The lens actuator 21 causes force that moves along the optical axis OA of the optical system 15 to act on the zoom lens 15B2. The lens actuator 21 is controlled by a lens driver 28. With the drive of the lens actuator 21 under the control of the lens driver 28, the position of the zoom lens 15B2 moves along the optical axis OA. With the movement of the position of the zoom lens 15B2 along the optical axis OA, the focal length of the surveillance camera 10 changes.

For example, in a case where a contour of the captured image is a rectangle having a short side in the direction of the pitch axis PA and having a long side in the direction of the yaw axis YA, the angle of view in the direction of the pitch axis PA is narrower than the angle of view in the direction of the yaw axis YA and the angle of view of a diagonal line.

With the optical system 15 configured in such a manner, light indicating an imaging region forms an image on the light-receiving surface 25A of the imaging element 25, and the imaging region is imaged by the imaging element 25.

By the way, a vibration provided to the surveillance camera 10 includes, in an outdoor situation, a vibration caused by passage of automobiles, a vibration caused by wind, a vibration caused by a road construction, and the like, and includes, in an indoor situation, a vibration caused by an air conditioner operation, a vibration caused by comings and goings of people, and the like. Thus, in the surveillance camera 10, a shake occurs due to the vibration provided to the surveillance camera 10 (hereinafter also simply referred to as "vibration").

In the present embodiment, the term "shake" refers to a phenomenon, in the surveillance camera 10, in which a target subject image on the light-receiving surface 25A of the imaging element 25 fluctuates due to a change in positional relationship between the optical axis OA and the light-receiving surface 25A. In other words, it can be said that the term "shake" is a phenomenon in which an optical image, which is obtained by the image forming on the light-receiving surface 25A, fluctuates due to a tilt of the optical axis OA caused by the vibration provided to the surveillance camera 10. The fluctuation of the optical axis OA means that the optical axis OA is tilted with respect to a reference axis (for example, the optical axis OA before the shake occurs). Hereinafter, the shake that occurs due to the vibration will be simply referred to as "shake".

The shake is included in the captured image as a noise component and affects image quality of the captured image. In order to remove the noise component included in the captured image due to the shake, the surveillance camera 10 comprises a lens-side shake correction mechanism 29, an imaging element-side shake correction mechanism 45, and an electronic shake correction unit 33, which are used for shake correction.

The lens-side shake correction mechanism 29 and the imaging element-side shake correction mechanism 45 are mechanical shake correction mechanisms. The mechanical shake correction mechanism is a mechanism that corrects the shake by applying, to a shake correction element (for example, anti-vibration lens 15B1 and/or imaging element 25), power generated by a driving source such as a motor (for example, voice coil motor) to move the shake correction element in a direction perpendicular to an optical axis of an imaging optical system.

Specifically, the lens-side shake correction mechanism 29 is a mechanism that corrects the shake by applying, to the anti-vibration lens 15B1, the power generated by the driving source such as the motor (for example, voice coil motor) to move the anti-vibration lens 15B1 in the direction perpendicular to the optical axis of the imaging optical system. The imaging element-side shake correction mechanism 45 is a mechanism that corrects the shake by applying, to the imaging element 25, the power generated by the driving source such as the motor (for example, voice coil motor) to move the imaging element 25 in the direction perpendicular to the optical axis of the imaging optical system. The electronic shake correction unit 33 performs image processing on the captured image based on a shake amount to correct the shake. That is, the shake correction unit (shake correction component) mechanically or electronically corrects the shake using a hardware configuration and/or a software configuration. The mechanical shake correction refers to the shake correction realized by mechanically moving the shake correction element, such as the anti-vibration lens 15B1 and/or the imaging element 25, using the power generated by the driving source such as the motor (for example, voice coil motor). The electronic shake correction refers to the shake correction realized by performing, for example, the image processing by a processor.

As shown in FIG. 4 as an example, the lens-side shake correction mechanism 29 comprises the anti-vibration lens 15B1, the lens actuator 17, the OIS driver 23, and a position sensor 39.

As a method of correcting the shake by the lens-side shake correction mechanism 29, various well-known methods can be employed. In the present embodiment, as the method of correcting the shake, a shake correction method is employed in which the anti-vibration lens 15B1 is caused to move based on the shake amount detected by a shake amount detection sensor 40 (described below). Specifically, the anti-vibration lens 15B1 is caused to move, by an amount with which the shake cancels, in a direction of canceling the shake to correct the shake.

The lens actuator 17 is attached to the anti-vibration lens 15B1. The lens actuator 17 is a shift mechanism equipped with the voice coil motor and drives the voice coil motor to cause the anti-vibration lens 15B1 to fluctuate in the direction perpendicular to the optical axis of the anti-vibration lens 15B1. Here, as the lens actuator 17, the shift mechanism equipped with the voice coil motor is employed, but the technique of the present disclosure is not limited thereto. Instead of the voice coil motor, another power source such as a stepping motor or a piezo element may be employed.

The lens actuator 17 is controlled by the OIS driver 23. With the drive of the lens actuator 17 under the control of the OIS driver 23, the position of the anti-vibration lens 15B1 mechanically fluctuates in a two-dimensional plane perpendicular to the optical axis OA.

The position sensor 39 detects a current position of the anti-vibration lens 15B1 and outputs a position signal indicating the detected current position. Here, as an example of the position sensor 39, a device including a Hall element is employed. Here, the current position of the anti-vibration lens 15B1 refers to a current position in an anti-vibration lens two-dimensional plane. The anti-vibration lens two-dimensional plane refers to a two-dimensional plane perpendicular to the optical axis of the anti-vibration lens 15B1. In the present embodiment, the device including the Hall element is employed as an example of the position sensor 39, but the technique of the present disclosure is not limited thereto. Instead of the Hall element, a magnetic sensor, a photo sensor, or the like may be employed.

The lens-side shake correction mechanism 29 causes the anti-vibration lens 15B1 to move along at least one of the direction of the pitch axis PA or the direction of the yaw axis YA in an actually imaged range to correct the shake. That is, the lens-side shake correction mechanism 29 causes the anti-vibration lens 15B1 to move in the anti-vibration lens two-dimensional plane by a movement amount corresponding to the shake amount to correct the shake.

The imaging element-side shake correction mechanism 45 comprises the imaging element 25, a body image stabilizer (BIS) driver 22, an imaging element actuator 27, and a position sensor 47.

In the same manner as the method of correcting the shake by the lens-side shake correction mechanism 29, various well-known methods can be employed as the method of correcting the shake by the imaging element-side shake correction mechanism 45. In the present embodiment, as the method of correcting the shake, a shake correction method is employed in which the imaging element 25 is caused to move based on the shake amount detected by the shake amount detection sensor 40. Specifically, the imaging element 25 is caused to move, by an amount with which the shake cancels, in a direction of canceling the shake to correct the shake.

The imaging element actuator 27 is attached to the imaging element 25. The imaging element actuator 27 is a shift mechanism equipped with the voice coil motor and drives the voice coil motor to cause the imaging element 25 to fluctuate in the direction perpendicular to the optical axis of the anti-vibration lens 15B1. Here, as the imaging element actuator 27, the shift mechanism equipped with the voice coil motor is employed, but the technique of the present disclosure is not limited thereto. Instead of the voice coil motor, another power source such as a stepping motor or a piezo element may be employed.

The imaging element actuator 27 is controlled by the BIS driver 22. With the drive of the imaging element actuator 27 under the control of the BIS driver 22, the position of the imaging element 25 mechanically fluctuates in the direction perpendicular to the optical axis OA.

The position sensor 47 detects a current position of the imaging element 25 and outputs a position signal indicating the detected current position. Here, as an example of the position sensor 47, a device including a Hall element is employed. Here, the current position of the imaging element 25 refers to a current position in an imaging element two-dimensional plane. The imaging element two-dimensional plane refers to a two-dimensional plane perpendicular to the optical axis of the anti-vibration lens 15B1. In the present embodiment, the device including the Hall element is employed as an example of the position sensor 47, but the technique of the present disclosure is not limited thereto. Instead of the Hall element, a magnetic sensor, a photo sensor, or the like may be employed.

The surveillance camera 10 comprises a computer 19, a digital signal processor (DSP) 31, an image memory 32, the electronic shake correction unit 33, a communication I/F 34, the shake amount detection sensor 40, and a user interface (UI) system device 43. The computer 19 comprises a memory 35, a storage 36, and a central processing unit (CPU) 37.

The imaging element 25, the DSP 31, the image memory 32, the electronic shake correction unit 33, the communication I/F 34, the memory 35, the storage 36, the CPU 37, the shake amount detection sensor 40, and the UI system device 43 are connected to a bus 38. Further, the OIS driver 23 is connected to the bus 38. In the example shown in FIG. 4, one bus is illustrated as the bus 38 for convenience of illustration, but a plurality of buses may be used. The bus 38 may be a serial bus or may be a parallel bus such as a data bus, an address bus, and a control bus.

The memory 35 temporarily stores various types of information, and is used as a work memory. A random access memory (RAM) is exemplified as an example of the memory 35, but the technique of the present disclosure is not limited thereto. Another type of storage device may be used. The storage 36 stores various programs for the surveillance camera 10. The CPU 37 reads out various programs from the storage 36 and executes the readout various programs on the memory 35 to control the entire surveillance camera 10. An example of the storage 36 includes a flash memory, SSD, EEPROM, or HDD. Further, for example, various non-volatile memories such as a magnetoresistive memory and a ferroelectric memory may be used instead of the flash memory or together with the flash memory.

The imaging element 25 is a complementary metal oxide semiconductor (CMOS) type image sensor. The imaging element 25 images a target subject at a predetermined frame rate under an instruction of the CPU 37. The term "predetermined frame rate" described herein refers to, for example, several tens of frames/second to several hundreds of frames/second. The imaging element 25 may incorporate a control device (imaging element control device). In this case, the imaging element control device performs detailed control inside the imaging element 25 in response to the imaging instruction output by the CPU 37. Further, the imaging element 25 may image the target subject at the predetermined frame rate under an instruction of the DSP 31. In this case, the imaging element control device performs detailed control inside the imaging element 25 in response to the imaging instruction output by the DSP 31. The DSP 31 may be referred to as an image signal processor (ISP).

The light-receiving surface 25A of the imaging element 25 is formed by a plurality of photosensitive pixels (not illustrated) arranged in a matrix. In the imaging element 25, each photosensitive pixel is exposed, and photoelectric conversion is performed for each photosensitive pixel. A charge obtained by performing the photoelectric conversion for each photosensitive pixel corresponds to an analog imaging signal indicating the target subject. Here, a plurality of photoelectric conversion elements (for example, photoelectric conversion elements in which color filters are disposed) having sensitivity to visible light are employed as the plurality of photosensitive pixels. In the imaging element 25, the photoelectric conversion element having sensitivity to R (red) light (for example, photoelectric conversion element in which an R filter corresponding to R is disposed), the photoelectric conversion element having sensitivity to G (green) light (for example, photoelectric conversion element in which a G filter corresponding to G is disposed), and the photoelectric conversion element having sensitivity to B (blue) light (for example, photoelectric conversion element in which a B filter corresponding to B is disposed) are employed as the plurality of photoelectric conversion elements. In the surveillance camera 10, these photosensitive pixels are used to perform the imaging based on the visible light (for example, light on a short wavelength side of about 700 nanometers or less). However, the present embodiment is not limited thereto. The imaging based on infrared light (for example, light on a wavelength side longer than about 700 nanometers) may be performed. In this case, the plurality of photoelectric conversion elements having sensitivity to the infrared light may be used as the plurality of photosensitive pixels. In particular, for example, an InGaAs sensor and/or a simulation of type-II quantum well (T2SL) sensor may be used for short-wavelength infrared (SWIR) imaging.

The imaging element 25 performs signal processing such as analog/digital (A/D) conversion on the analog imaging signal to generate a digital image that is a digital imaging signal. The imaging element 25 is connected to the DSP 31 via the bus 38 and outputs the generated digital image to the DSP 31 in units of frames via the bus 38.

Here, the CMOS image sensor is exemplified for description as an example of the imaging element 25, but the technique of the present disclosure is not limited thereto. A charge coupled device (CCD) image sensor may be employed as the imaging element 25. In this case, the imaging element 25 is connected to the bus 38 via an analog front end (AFE) (not illustrated) that incorporates a CCD driver. The AFE performs the signal processing, such as the A/D conversion, on the analog imaging signal obtained by the imaging element 25 to generate the digital image and output the generated digital image to the DSP 31. The CCD image sensor is driven by the CCD driver incorporated in the AFE. Of course, the CCD driver may be independently provided.

The DSP 31 performs various kinds of digital signal processing on the digital image. For example, the various types of digital signal processing refer to demosaicing, noise removal processing, gradation correction processing, and color correction processing. The DSP 31 outputs the digital image after the digital signal processing to the image memory 32 for each frame. The image memory 32 stores the digital image from the DSP 31.

The shake amount detection sensor 40 is, for example, a device including a gyro sensor, and detects the shake amount of the surveillance camera 10. In other words, the shake amount detection sensor 40 detects the shake amount in each of a pair of axial directions. The gyro sensor detects a rotational shake amount around respective axes (refer to FIG. 1) of the pitch axis PA, the yaw axis YA, and a roll axis RA (axis parallel to the optical axis OA). The shake amount detection sensor 40 converts the rotational shake amount around the pitch axis PA and the rotational shake amount around the yaw axis YA, which are detected by the gyro sensor, into the shake amount in a two-dimensional plane parallel to the pitch axis PA and the yaw axis YA to detect the shake amount of the surveillance camera 10.

Here, the gyro sensor is exemplified as an example of the shake amount detection sensor 40, but this is merely an example. The shake amount detection sensor 40 may be an acceleration sensor. The acceleration sensor detects the shake amount in the two-dimensional plane parallel to the pitch axis PA and the yaw axis YA. The shake amount detection sensor 40 outputs the detected shake amount to the CPU 37.

Further, although the form example is shown in which the shake amount is detected by a physical sensor called the shake amount detection sensor 40, the technique of the present disclosure is not limited thereto. For example, a movement vector obtained by comparing preceding and succeeding captured images in time series, which are stored in the image memory 32, may be used as the shake amount. Further, the shake amount to be finally used may be derived based on the shake amount detected by the physical sensor and the movement vector obtained by the image processing.

The CPU 37 acquires the shake amount detected by the shake amount detection sensor 40 and controls the lens-side shake correction mechanism 29, the imaging element-side shake correction mechanism 45, and the electronic shake correction unit 33 based on the acquired shake amount. The shake amount detected by the shake amount detection sensor 40 is used for the shake correction by each of the lens-side shake correction mechanism 29 and the electronic shake correction unit 33.

The electronic shake correction unit 33 is a device including an application specific integrated circuit (ASIC). The electronic shake correction unit 33 performs the image processing on the captured image in the image memory 32 based on the shake amount detected by the shake amount detection sensor 40 to correct the shake.

Here, the device including the ASIC is exemplified as the electronic shake correction unit 33, but the technique of the present disclosure is not limited thereto. For example, a device including a field programmable gate array (FPGA) or a programmable logic device (PLD) may be used. Further, for example, the electronic shake correction unit 33 may be a device including a plurality of ASICs, FPGAs, and PLDs. Further, a computer including a CPU, a storage, and a memory may be employed as the electronic shake correction unit 33. The number of CPUs may be singular or plural. Further, the electronic shake correction unit 33 may be realized by a combination of a hardware configuration and a software configuration.

The communication I/F 34 is, for example, a network interface, and controls transmission of various kinds of information to and from the management apparatus 11 via a network. An example of the network includes a wide area network (WAN) such as the Internet or a public communication network. The communication I/F 34 performs communication between the surveillance camera 10 and the management apparatus 11.

The UI system device 43 comprises a reception device 43A and a display 43B. The reception device 43A is, for example, a hard key, a touch panel, and the like, and receives various instructions from a user. The CPU 37 acquires various instructions received by the reception device 43A and operates in response to the acquired instructions.

The display 43B displays various kinds of information under the control of the CPU 37. Examples of the various kinds of information displayed on the display 43B include a content of various instructions received by the reception device 43A and the captured image.

Configuration of Electrical System of Revolution Mechanism 16 and Management Apparatus 11

Figure 5:
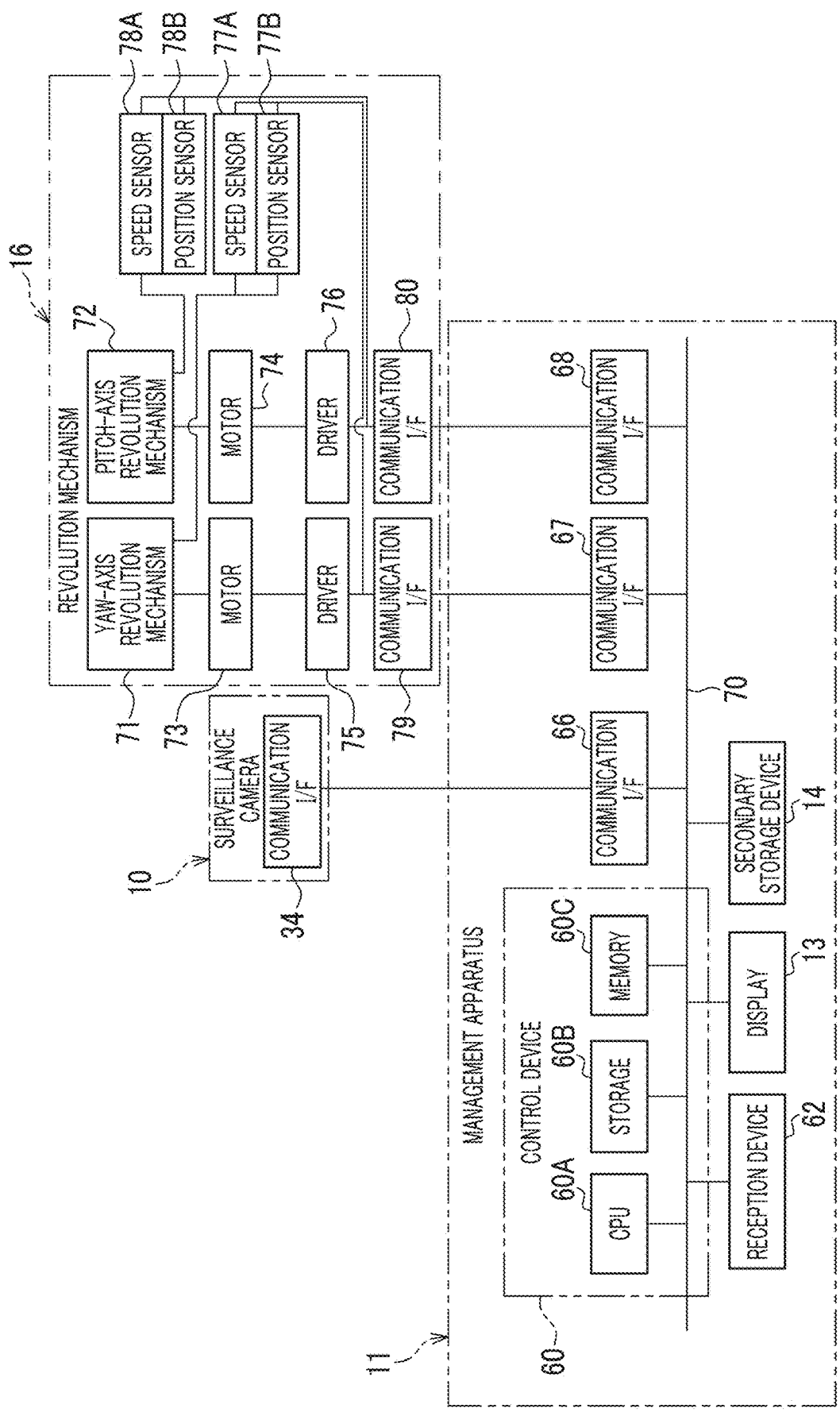
FIG. 5 is a diagram showing an example of a configuration of an electrical system of the revolution mechanism 16 and the management apparatus 11.

FIG. 5 is a diagram showing an example of a configuration of an electrical system of the revolution mechanism 16 and the management apparatus 11. As shown in FIG. 5 as an example, the revolution mechanism 16 comprises a yaw-axis revolution mechanism 71, a pitch-axis revolution mechanism 72, a motor 73, a motor 74, a driver 75, a driver 76, speed sensors 77A and 78A, position sensors 77B and 78B, and communication I/Fs 79 and 80.

The yaw-axis revolution mechanism 71 causes the surveillance camera 10 to revolve in the yaw direction. The motor 73 is driven to generate the power under the control of the driver 75. The yaw-axis revolution mechanism 71 receives the power generated by the motor 73 to cause the surveillance camera 10 to revolve in the yaw direction. The pitch-axis revolution mechanism 72 causes the surveillance camera 10 to revolve in the pitch direction. The motor 74 is driven to generate the power under the control of the driver 76. The pitch-axis revolution mechanism 72 receives the power generated by the motor 74 to cause the surveillance camera 10 to revolve in the pitch direction.

The speed sensor 77A detects the revolution speed of the yaw-axis revolution mechanism 71. The position sensor 77B detects a revolution position of the yaw-axis revolution mechanism 71. The revolution position of the yaw-axis revolution mechanism 71 refers to an orientation in the yaw direction. The speed sensor 78A detects the revolution speed of the pitch-axis revolution mechanism 72. The position sensor 78B detects the revolution position of the pitch-axis revolution mechanism 72. The revolution position of the pitch-axis revolution mechanism 72 refers to an orientation in the pitch direction.

The communication I/Fs 79 and 80 are, for example, network interfaces, and control transmission of various kinds of information to and from the management apparatus 11 via the network. An example of the network includes a wide area network (WAN) such as the Internet or a public communication network. The communication I/Fs 79 and 80 perform communication between the revolution mechanism 16 and the management apparatus 11.

As shown in FIG. 5 as an example, the management apparatus 11 comprises the display 13a, the secondary storage device 14, a control device 60, a reception device 62, and communication I/Fs 66, 67, and 68. The control device 60 comprises a CPU 60A, a storage 60B, and a memory 60C. The CPU 60A is an example of the processor in the present invention.

Each of the reception device 62, the display 13a, the secondary storage device 14, the CPU 60A, the storage 60B, the memory 60C, and the communication I/F 66 is connected to a bus 70. In the example shown in FIG. 5, one bus is illustrated as the bus 70 for convenience of illustration, but a plurality of buses may be used. The bus 70 may be a serial bus or may be a parallel bus including a data bus, an address bus, a control bus, and the like.

The memory 60C temporarily stores various kinds of information and is used as the work memory. An example of the memory 60C includes the RAM, but the technique of the present disclosure is not limited thereto. Another type of storage device may be employed. Various programs for the management apparatus 11 (hereinafter simply referred to as "programs for management apparatus") are stored in the storage 60B.

The CPU 60A reads out the program for management apparatus from the storage 60B and executes the readout program for management apparatus on the memory 60C to control the entire management apparatus 11. The program for management apparatus includes a control program according to the embodiment of the present invention.

The communication I/F 66 is, for example, a network interface. The communication I/F 66 is communicably connected to the communication I/F 34 of the surveillance camera 10 via the network, and controls transmission of various kinds of information to and from the surveillance camera 10. The communication I/Fs 67 and 68 are, for example, network interfaces. The communication I/F 67 is communicably connected to the communication I/F 79 of the revolution mechanism 16 via the network, and controls transmission of various kinds of information to and from the yaw-axis revolution mechanism 71. The communication I/F 68 is communicably connected to the communication I/F 80 of the revolution mechanism 16 via the network, and controls transmission of various kinds of information to and from the pitch-axis revolution mechanism 72.

The CPU 60A receives the captured image, the imaging information, and the like from the surveillance camera 10 via the communication I/F 66 and the communication I/F 34.

The CPU 60A acquires revolution speed information from the speed sensor 77A of the revolution mechanism 16 via the communication I/F 67 and the communication I/F 79. Further, the CPU 60A acquires revolution position information from the position sensor 77B via the communication I/F 68 and the communication I/F 80.

The CPU 60A controls the driver 75 and the motor 73 of the revolution mechanism 16 via the communication I/F 67 and the communication I/F 79 to control a revolution operation of the yaw-axis revolution mechanism 71. Further, the CPU 60A controls the driver 76 and the motor 74 of the revolution mechanism 16 via the communication I/F 68 and the communication I/F 80 to control the revolution operation of the pitch-axis revolution mechanism 72.

For example, the CPU 60A switches a control method related to the revolution operation of the revolution mechanism 16, based on at least any one of an imaging condition of the surveillance camera 10 or operating information of the revolution mechanism 16. The control method related to the revolution operation of the revolution mechanism 16 includes "speed control" and "position control".

The speed control is to perform a continuous revolution with a command value related to the speed as an input factor for control. The speed control is an example of first control according to the embodiment of the present invention. In the speed control, a revolution instruction is output with the revolution speeds in the pitch direction and the yaw direction as input factors. In the speed control, the revolution is continued at a speed of the output revolution instruction. A revolution end instruction needs to be output to end the revolution. Oblique revolution can be performed by the revolution in both the pitch direction and the yaw direction. However, in a case of the speed control, low-speed revolution that is originally possessed by a revolution table may not be performed depending on a protocol used for control or the like. In a case where the surveillance camera 10 is in a telephoto state in a state where the revolution cannot be performed at a sufficiently low speed, the revolution speed in a video is increased, and the surveillance camera 10 may not be able to revolve to a predetermined position at an appropriate speed.

The position control is to perform a discrete revolution with a command value related to the position as the input factor for control. The position control is an example of second control according to the embodiment of the present invention. In the position control, the revolution instruction is output with the revolution positions in the pitch direction and the yaw direction as input factors. In the position control, a revolution angle from a current position to a target position is continuously output as the revolution instruction while the target position is changed. The revolution instruction is output while directly inputting a revolution position of a predetermined angle (for example, 1°) for the pitch axis PA and the yaw axis YA, as a factor. The revolution is stopped in a case where the target position is reached. Thus, there is no need to output the revolution end instruction unlike the speed control. In the position control, the revolution instruction is output while the target position is continuously changed. Therefore, although the revolution is discrete, the low-speed revolution can be performed on average, as compared with the speed control. Further, in the position control, since the target position is continuously set and the revolution instruction is output, a difference depending on the protocol is unlikely to occur, and it is possible to perform fine position control in the pitch direction and the yaw direction. The position control enables the surveillance camera 10 to revolve at a lower speed than the speed control.

The imaging condition of the surveillance camera 10 includes, for example, a position of an optical zoom of the surveillance camera 10, a position of an electronic zoom (digital zoom), an angle of view of imaging, a visual angle, and the like. Further, the imaging condition of the surveillance camera 10 may include, for example, an exposure time of the imaging performed by the surveillance camera 10 and a frame rate of imaging. Further, the imaging condition of the surveillance camera 10 may include, for example, a state of anti-vibration control of the imaging performed by the surveillance camera 10. The state of anti-vibration control refers to on/off of correction or strong/weak of correction by the lens-side shake correction mechanism 29, the imaging element-side shake correction mechanism 45, and the electronic shake correction unit 33. Further, the imaging condition of the surveillance camera 10 may include, for example, a resolution of the imaging performed by the surveillance camera 10.

The operating information of the revolution mechanism 16 includes, for example, a revolution history of the revolution mechanism 16. The revolution history includes a surveillance time of each surveillance region, the number of times the revolution mechanism 16 is stopped in each surveillance region, and the like.

Further, for example, the CPU 60A switches between the speed control and the position control based on whether or not the revolution position of the revolution mechanism 16 and the revolution history of the revolution mechanism 16 satisfy a predetermined condition. Further, the CPU 60A performs interpolation control of shifting a revolution image by the image processing between the discrete revolution and revolution by the position control. Further, the CPU 60A performs control of changing a cutout range of a predetermined region cut out from imaging data of the surveillance camera 10 in accordance with the revolution by the speed control or the position control, based on quality (communication delay amount) of the communication performed with the surveillance camera 10, and shifting a display captured image displayed on the display 13a. Further, the CPU 60A controls the revolution speed of the revolution mechanism 16 based on the angle of view of the imaging performed by the surveillance camera 10. Similarly, the CPU 60A controls the revolution speed of the revolution mechanism 16 based on the quality of communication performed with the surveillance camera 10.

The reception device 62 is, for example, the keyboard 13b, the mouse 13c, and a touch panel of the display 13a, and receives various instructions from the user. The CPU 60A acquires various instructions received by the reception device 62 and operates in response to the acquired instructions. For example, in a case where the reception device 62 receives a processing content for the surveillance camera 10 and/or the revolution mechanism 16, the CPU 60A causes the surveillance camera 10 and/or the revolution mechanism 16 to operate in accordance with an instruction content received by the reception device 62.

The display 13a displays various kinds of information under the control of the CPU 60A. Examples of the various kinds of information displayed on the display 13a include contents of various instructions received by the reception device 62 and the captured image or imaging information received by the communication I/F 66. The CPU 60A causes the display 13a to display the contents of various instructions received by the reception device 62 and the captured image or imaging information received by the communication I/F 66.

The secondary storage device 14 is, for example, a non-volatile memory and stores various kinds of information under the control of the CPU 60A. An example of the various kinds of information stored in the secondary storage device 14 includes the captured image or imaging information received by the communication I/F 66. The CPU 60A stores the captured image or imaging information received by the communication I/F 66 in the secondary storage device 14.

Operation Control of Revolution Mechanism 16 by CPU 60A of Management Apparatus 11

Next, an operation control example of controlling the operation of the revolution mechanism 16 by the CPU 60A of the management apparatus 11 will be described.

Here, first, an example of an installation situation and a handling operation of the surveillance camera 10 that is caused to revolve by the revolution mechanism 16 will be described with reference to FIG. 1. For example, the surveillance camera 10 is installed on a wall in a building toward an entrance of the building in order to image a subject that enters and exits the building. An operator is present in front of the management apparatus 11 and views the captured image of the surveillance camera 10 displayed on the display 13a. The operator operates the keyboard 13b or the mouse 13c of the management apparatus 11 or performs a touch operation on a surface of the display 13a to monitor the subject while performing the revolution operation of the surveillance camera 10.

Figure 6:
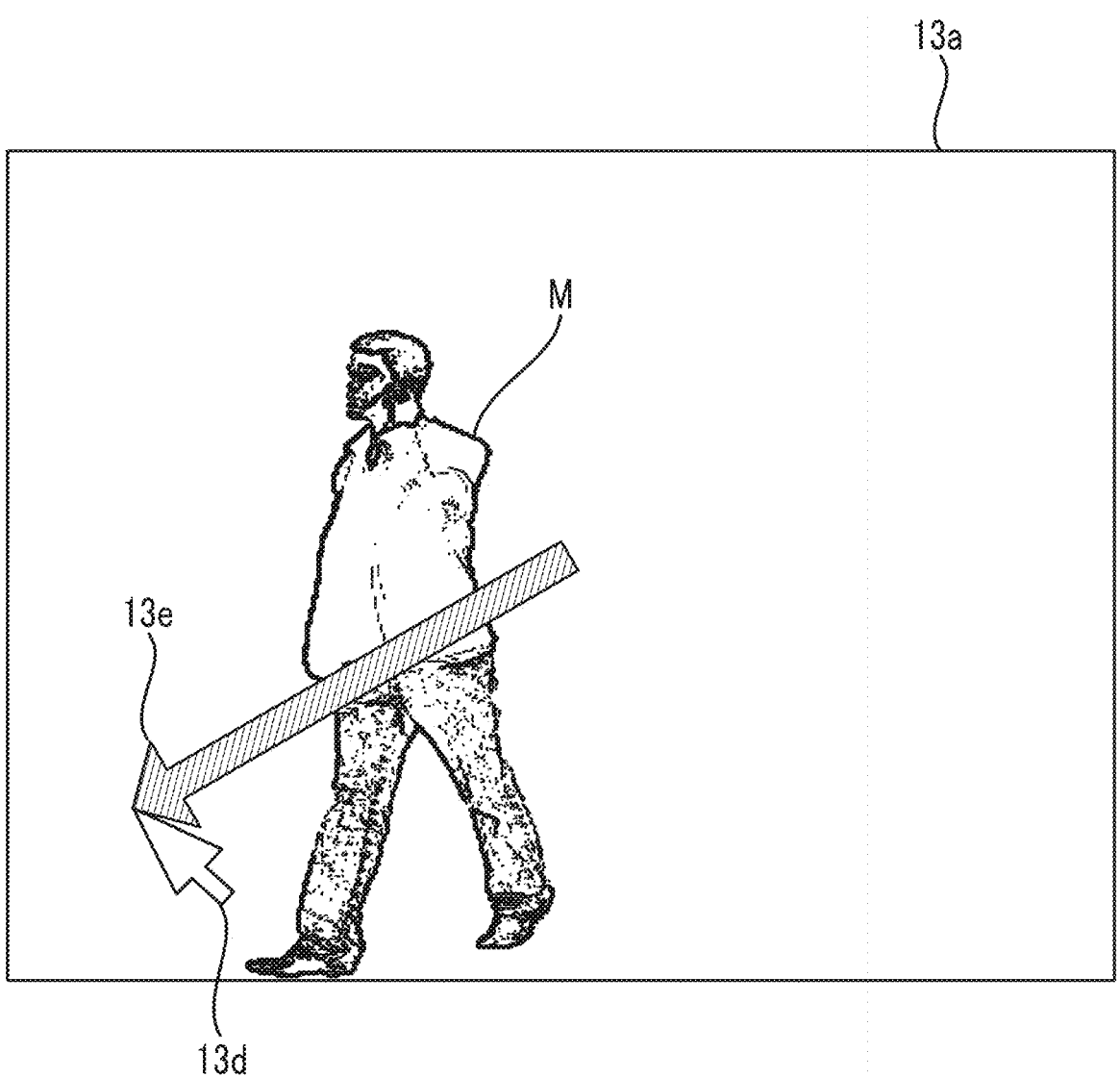

FIG. 6 is a diagram showing an example of the captured image displayed on the display 13a. The captured image shows that a surveillance target subject M is monitored. The surveillance target subject M is moved to a lower left direction on the screen of the display 13a. Thus, there is a situation where the surveillance target subject M deviates from the imaging region of the surveillance camera 10 under such a state. For example, the operator operates the mouse 13c to move the cursor 13d to any position in the lower left direction on the screen of the display 13a where the surveillance target subject M is moved, and clicks the position. Accordingly, by the CPU 60A of the management apparatus 11, an arrow line 13e extending from a center position of the screen to the position of the cursor 13d is displayed on the screen of the display 13a, and the surveillance camera 10 is caused to revolve in a direction of the arrow line 13e. Further, the revolution speed of the surveillance camera 10 in this case is controlled in accordance with a length of the arrow line 13e, that is, how far a position from the center position of the screen is clicked.

First Operation Control Example

Figure 7:
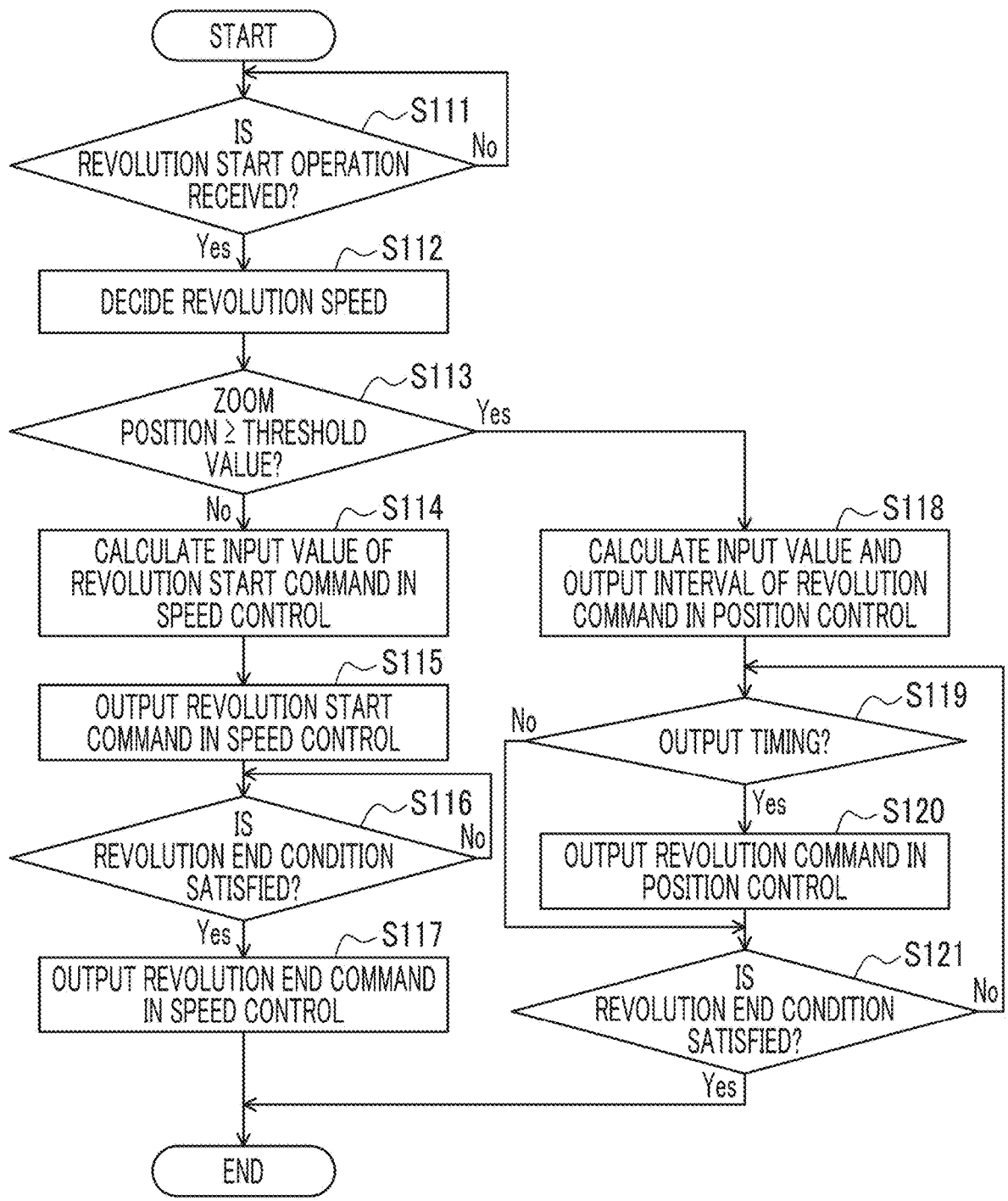
FIG. 7 is a flowchart showing a first operation control example of controlling an operation of the revolution mechanism 16 by a CPU 60A of the management apparatus 11.

FIG. 7 is a flowchart showing a first operation control example of controlling the operation of the revolution mechanism 16 by the CPU 60A of the management apparatus 11. The CPU 60A of the management apparatus 11 executes, for example, processing shown in FIG. 7 as the operation control of the revolution mechanism 16.

First, the CPU 60A of the management apparatus 11 determines whether or not a revolution start operation of starting the revolution of the surveillance camera 10 is received (step S111). The revolution start operation of starting the revolution of the surveillance camera 10 is, for example, the click operation (refer to FIG. 6) of the mouse 13c performed by the operator as described above. Alternatively, the revolution start operation may be an operation of pressing down a button (not including a release of the button) of the mouse 13c by the operator.

Next, the CPU 60A decides the revolution speed of the surveillance camera 10 caused to revolve by the revolution mechanism 16 (step S112). The revolution speed is decided based on the length of the arrow line 13e displayed in a case where the operator designates and clicks the position of the cursor 13d on the screen. The revolution speed is decided such that the revolution speed is faster as the length of the arrow line 13e is longer, and the revolution speed is slower as the length of the arrow line 13e is shorter. Further, the direction in which the surveillance camera 10 revolves is decided by the direction of the arrow line 13e.

Next, the CPU 60A determines whether or not a zoom position of the surveillance camera 10 is equal to or larger than a threshold value (step S113). The zoom position means, for example, the angle of view currently set in the surveillance camera 10. An operation of the management apparatus 11 by the operator can change the angle of view of the surveillance camera 10. For example, with a touch operation on a zoom button displayed on the screen of the display 13a, it is possible to change the angle of view of the surveillance camera 10.

In step S113, in a case where the zoom position of the surveillance camera 10 is not equal to or larger than the threshold value (step S113: No), the CPU 60A switches the revolution method of the surveillance camera 10 by the revolution mechanism 16 to the speed control. Since the surveillance camera 10 is set at the zoom position less than the threshold value, that is, at a certain wide angle of view (wide angle), the CPU 60A determines that the situation is suitable for relatively high-speed revolution. The CPU 60A calculates an input value of a revolution start command to start the revolution of the surveillance camera 10 by the speed control (step S114). The input value of the revolution start command refers to a speed command to cause the surveillance camera 10 to revolve at the revolution speed decided in step S112.

Next, the CPU 60A outputs the revolution start command including the input value calculated in step S114 to the revolution mechanism 16 (step S115). Accordingly, the motors 73 and 74 of the revolution mechanism 16 are started, and the surveillance camera 10 is subjected to the speed control at the revolution speed decided in step S112 to revolve.

Next, the CPU 60A determines whether or not a condition for ending the revolution of the revolution mechanism 16 is satisfied (step S116). The condition for ending the revolution is, for example, that an operation of ending the revolution is performed by the operator. Specifically, the condition for ending the revolution is that the operator moves the cursor 13d to a center portion on the screen of the display 13a and clicks the center portion. Alternatively, the condition for ending the revolution is that the operator moves the cursor 13d to a center portion on the screen of the display 13a and clicks the center portion. Alternatively, in a case where the revolution start operation is the operation of pressing down the button of the mouse 13c, the condition for ending the revolution may be the release of the pressed button of the mouse 13c.

In step S116, in a case where the condition for ending the revolution of the revolution mechanism 16 is not satisfied (step S116: No), the CPU 60A repeats the processing of step S116 and waits until the condition for ending the revolution is satisfied.

In step S116, in a case where the condition for ending the revolution of the revolution mechanism 16 is satisfied (step S116: Yes), the CPU 60A outputs a revolution end command to end the revolution of the surveillance camera 10 in the speed control (step S117), and ends the present processing.

On the other hand, in step S113, in a case where the zoom position of the surveillance camera 10 is equal to or larger than the threshold value (step S113: Yes), the CPU 60A switches the revolution method of the surveillance camera 10 by the revolution mechanism 16 to the position control. Since the surveillance camera 10 is set at the zoom position equal to or larger than the threshold value, that is, at a certain narrow angle of view (narrow angle (telephoto)), the CPU 60A determines that a situation is required in which relatively low-speed revolution is necessary. The CPU 60A calculates the input value of the revolution command to cause the surveillance camera 10 to revolve by the position control and an output interval of the revolution command (step S118). For example, in a case where the revolution command to cause the surveillance camera 10 to revolve by a predetermined angle (for example, 1°) is continuously output to the revolution mechanism 16, the output interval of the revolution command is an interval (for example, 100 msec) at which the revolution command is output.

Next, the CPU 60A determines, based on the output interval (100 msec) calculated in step S118, whether or not a current time is a timing (whether 100 msec has elapsed) at which the revolution command is output (step S119).

In step S119, in a case where the timing at which the revolution command is output is reached (step S119: Yes), the CPU 60A outputs the revolution command including the input value calculated in step S18 to the revolution mechanism 16 (step S120). Accordingly, the motors 73 and 74 of the revolution mechanism 16 are started, and the surveillance camera 10 is subjected to the position control at the revolution speed decided in step S112 to revolve.

Next, the CPU 60A determines whether or not the condition for ending the revolution of the revolution mechanism 16 is satisfied (step S121). The condition for ending the revolution is the same as the condition under which the operation described in step S116 is performed.

In step S121, in a case where the condition for ending the revolution of the revolution mechanism 16 is not satisfied (step S121: No), the CPU 60A returns to step S119 and repeats each piece of processing of step S119 and subsequent steps.

In step S121, in a case where the condition for ending the revolution of the revolution mechanism 16 is satisfied (step S121: Yes), the CPU 60A ends the revolution of the surveillance camera 10 in the position control.

On the other hand, in step S119, in a case where the timing at which the revolution command is output is not reached (step S119: No), the CPU 60A proceeds to step S121 and executes the processing of step S121 and subsequent steps.

As described above, in the first operation control example by the CPU 60A of the management apparatus 11, the speed control and the position control related to the operation of the revolution mechanism 16 are switched based on the angle of view of the imaging performed by the surveillance camera 10. The speed control uses the command value related to the speed as the input factor, and the position control uses the command value related to the position as the input factor. The position control can allow the surveillance camera 10 to revolve at a lower speed than the speed control. Accordingly, it is possible to perform the revolution control of the surveillance camera 10 at an appropriate revolution speed in accordance with the angle of view of the imaging. That is, it is possible to achieve the low speed in the position control, which cannot be achieved in the speed control. With the position control in a case where the surveillance camera 10 is set at the narrow angle (telephoto), it is possible to cause the surveillance camera 10 to revolve at a low speed necessary in the narrow angle setting state. The reason for this is that with the revolution while gradually changing the target position of a movement destination using the position control, the revolution speed of the revolution of a short movement distance that is continuously repeated can be realized to be even slower than the slowest revolution speed in the speed control on average. Therefore, it is possible to appropriately operate a revolution amount of the surveillance camera 10 even in a case where the surveillance camera 10 is set at the narrow angle (telephoto), and thus it is possible to improve the usability of the operator who operates the surveillance camera 10 from a remote distance, for example.

Further, in the operation control example, the operation by the operator for causing the surveillance camera 10 to revolve is performed by the operation of the mouse 13c. However, the technique of the present disclosure is not limited thereto. For example, the above operation may be performed by an operation of pressing an arrow key on the keyboard 13b. Alternatively, a joystick (not illustrated) may be provided and the above operation may be performed by an operation of tilting the joystick. Further, the above operation may be performed by a touch operation (scroll operation) on the screen of the display 13a.

In the operation of pressing the arrow key of the keyboard 13b, in a case where the revolution operation is configured to be continued for a predetermined time in a case where the key is pressed once, the condition for ending the revolution may be satisfied with elapse of the predetermined revolution time. Further, in a case where the joystick is operated, the condition for ending the revolution may be satisfied with return of the tilted joystick to an original position. Further, in a case where the touch operation is performed on the screen of the display 13a, the condition for ending the revolution may be satisfied with a stop of scrolling in response to the touch operation.

Second Operation Control Example

Figure 8:
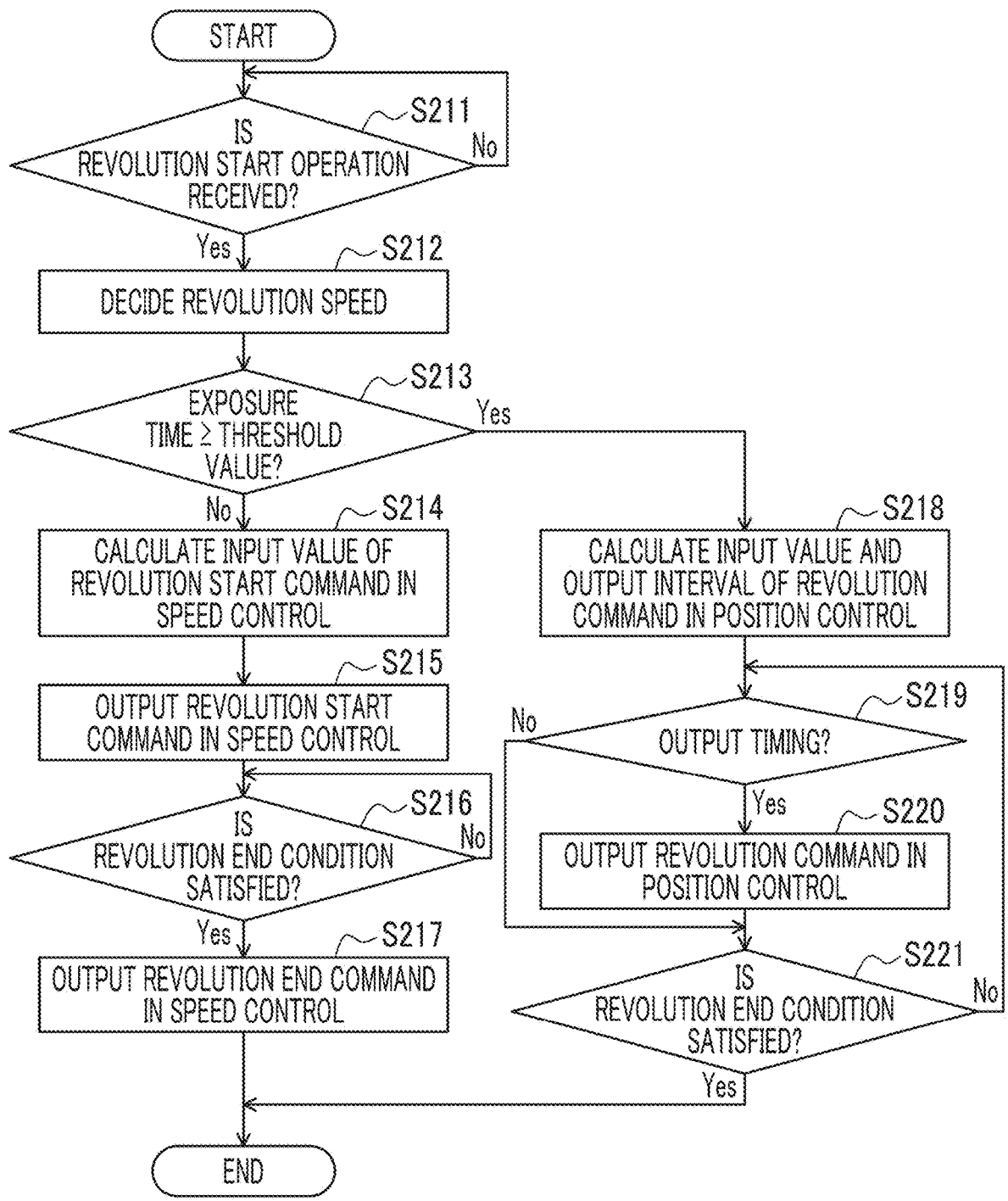
FIG. 8 is a flowchart showing a second operation control example of controlling the operation of the revolution mechanism 16 by the CPU 60A of the management apparatus 11.

FIG. 8 is a flowchart showing a second operation control example of controlling the operation of the revolution mechanism 16 by the CPU 60A of the management apparatus 11. The CPU 60A executes, for example, processing shown in FIG. 8 as the operation control of the revolution mechanism 16.

First, the CPU 60A determines whether or not the revolution start operation of starting the revolution of the surveillance camera 10 is received (step S211). Next, the CPU 60A decides the revolution speed of the surveillance camera 10 caused to revolve by the revolution mechanism 16 (step S212). Each piece of processing of step S211 and step S212 has the same processing content as each piece of processing of step S111 and step S112 shown in FIG. 7.

Next, the CPU 60A determines whether or not the exposure time currently set in the surveillance camera 10 is equal to or longer than a threshold value (step S213). The operation of the management apparatus 11 by the operator can change the exposure time of the surveillance camera 10. For example, with a touch operation on an exposure button displayed on the screen of the display 13a, it is possible to change the exposure of the surveillance camera 10.

In step S213, in a case where the exposure time of the surveillance camera 10 is not equal to or longer than the threshold value (step S213: No), the CPU 60A switches the revolution method of the surveillance camera 10 by the revolution mechanism 16 to the speed control. Since the exposure time of the surveillance camera 10 is set to the exposure time less than the threshold value, that is, to a certain fast shutter speed, the CPU 60A determines that the situation is suitable for relatively high-speed revolution. The CPU 60A calculates the input value of the revolution start command to start the revolution of the surveillance camera 10 by the speed control (step S214). Each piece of processing from step S214 to step S217 has the same processing content as each piece of processing of step S114 to step S117 shown in FIG. 7.

The CPU 60A outputs the revolution start command including the input value calculated in step S214 to the revolution mechanism 16 (step S215). Accordingly, the surveillance camera 10 is subjected to the speed control at the revolution speed decided in step S212 to revolve.

Next, the CPU 60A determines whether or not the condition for ending the revolution of the revolution mechanism 16 is satisfied (step S216). In a case where the condition for ending the revolution is not satisfied (step S216: No), the CPU 60A repeats the processing of step S216 and waits until the condition for ending the revolution is satisfied. On the other hand, in step S216, in a case where the condition for ending the revolution of the revolution mechanism 16 is satisfied (step S216: Yes), the CPU 60A outputs the revolution end command to end the revolution of the surveillance camera 10 in the speed control (step S217), and ends the present processing.

On the other hand, in step S213, in a case where the exposure time of the surveillance camera 10 is equal to or longer than the threshold value (step S213: Yes), the CPU 60A switches the revolution method of the surveillance camera 10 by the revolution mechanism 16 to the position control. Since the exposure time of the surveillance camera 10 is set to the exposure time equal to or longer than the threshold value, that is, to a certain slow shutter speed, the CPU 60A determines that a situation is required in which relatively low-speed revolution is necessary. The CPU 60A calculates the input value of the revolution command to cause the surveillance camera 10 to revolve by the position control and the output interval of the revolution command (step S218). Each piece of processing from step S218 to step S221 has the same processing content as each piece of processing of step S118 to step S121 shown in FIG. 7.

Next, the CPU 60A determines, based on the output interval calculated in step S218, whether or not a current time is a timing at which the revolution command is output (step S219). In a case where the timing at which the revolution command is output is reached (step S219: Yes), the CPU 60A outputs the revolution command including the input value calculated in step S218 to the revolution mechanism 16 (step S220). Accordingly, the surveillance camera 10 is subjected to the position control at the revolution speed decided in step S212 to revolve.

Next, the CPU 60A determines whether or not the condition for ending the revolution of the revolution mechanism 16 is satisfied (step S221). In a case where the condition for ending the revolution is not satisfied (step S221: No), the CPU 60A returns to step S219 and repeats each piece of processing of step S219 and subsequent steps. On the other hand, in step S221, in a case where the condition for ending the revolution of the revolution mechanism 16 is satisfied (step S221: Yes), the CPU 60A ends the revolution of the surveillance camera 10 in the position control.

On the other hand, in step S219, in a case where the timing at which the revolution command is output is not reached (step S219: No), the CPU 60A proceeds to step S221 and executes the processing of step S221 and subsequent steps.

As described above, in the second operation control example by the CPU 60A of the management apparatus 11, the speed control and the position control related to the operation of the revolution mechanism 16 are switched based on the exposure time of the imaging performed by the surveillance camera 10. Accordingly, it is possible to perform the revolution control of the surveillance camera 10 at an appropriate revolution speed in accordance with the exposure time of the imaging. That is, in a case where the exposure time of the surveillance camera 10 is set to be longer than a predetermined time, it is possible to cause the surveillance camera 10 to revolve at a low speed necessary in a state where the exposure time is long, using the position control. Thus, it is possible to make the captured image less likely to blur even in a case where the exposure time of the surveillance camera 10 is set to be long, and thus it is possible to improve the usability of the operator.

Third Operation Control Example

Figure 9:
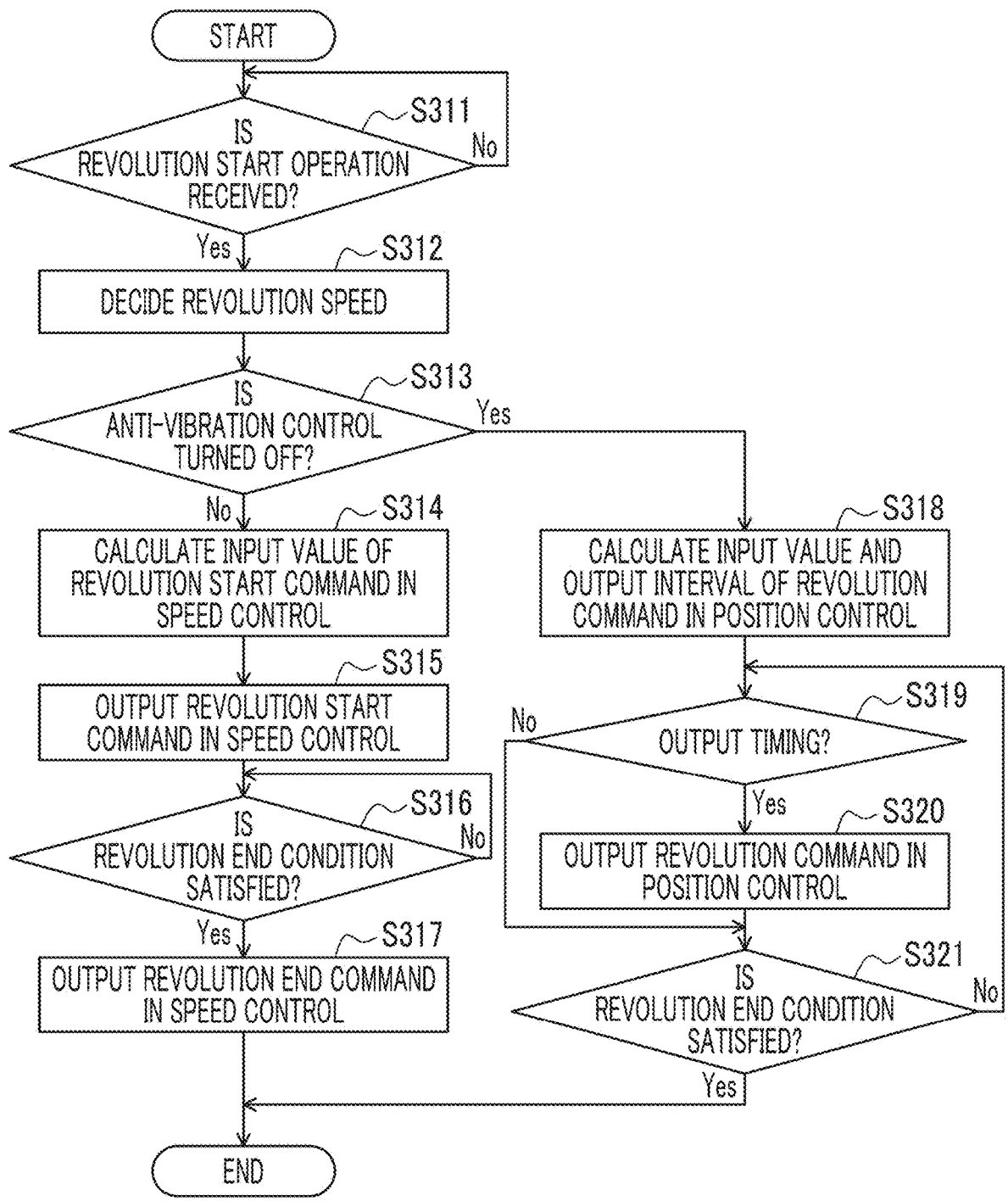
FIG. 9 is a flowchart showing a third operation control example of controlling the operation of the revolution mechanism 16 by the CPU 60A of the management apparatus 11.

FIG. 9 is a flowchart showing a third operation control example of controlling the operation of the revolution mechanism 16 by the CPU 60A of the management apparatus 11. The CPU 60A executes, for example, processing shown in FIG. 9 as the operation control of the revolution mechanism 16.

First, the CPU 60A determines whether or not the revolution start operation of starting the revolution of the surveillance camera 10 is received (step S311). Next, the CPU 60A decides the revolution speed of the surveillance camera 10 caused to revolve by the revolution mechanism 16 (step S312). Each piece of processing of step S311 and step S312 has the same processing content as each piece of processing of step S111 and step S112 shown in FIG. 7.

Next, the CPU 60A determines whether or not the anti-vibration control currently set in the surveillance camera 10 is turned off (step S313). As described above, the anti-vibration control of the surveillance camera 10 is to perform shake removal correction by the lens-side shake correction mechanism 29, the imaging element-side shake correction mechanism 45, and the electronic shake correction unit 33. The anti-vibration control of the surveillance camera 10 can be turned on/off or strong/weak correction by the operation of the management apparatus 11 by the operator. For example, with a touch operation on an anti-vibration button displayed on the screen of the display 13a, it is possible to set the anti-vibration control of the surveillance camera 10.

In step S313, in a case where the anti-vibration control of the surveillance camera 10 is not turned off (step S313: No), the CPU 60A switches the revolution method of the surveillance camera 10 by the revolution mechanism 16 to the speed control. Since the anti-vibration control of the surveillance camera 10 is turned on, that is, since the shake correction is performed, the CPU 60A determines that the situation is suitable for relatively high-speed revolution. The CPU 60A calculates the input value of the revolution start command to start the revolution of the surveillance camera 10 by the speed control (step S314). Each piece of processing from step S314 to step S317 has the same processing content as each piece of processing of step S114 to step S117 shown in FIG. 7.

The CPU 60A outputs the revolution start command including the input value calculated in step S314 to the revolution mechanism 16 (step S315). Accordingly, the surveillance camera 10 is subjected to the speed control at the revolution speed decided in step S312 to revolve.

Next, the CPU 60A determines whether or not the condition for ending the revolution of the revolution mechanism 16 is satisfied (step S316). In a case where the condition for ending the revolution is not satisfied (step S316: No), the CPU 60A repeats the processing of step S316 and waits until the condition for ending the revolution is satisfied. On the other hand, in step S316, in a case where the condition for ending the revolution of the revolution mechanism 16 is satisfied (step S316: Yes), the CPU 60A outputs the revolution end command to end the revolution of the surveillance camera 10 in the speed control (step S317), and ends the present processing.

On the other hand, in step S313, in a case where the anti-vibration control of the surveillance camera 10 is turned off (step S313: Yes), the CPU 60A switches the revolution method of the surveillance camera 10 by the revolution mechanism 16 to the position control. Since the anti-vibration control of the surveillance camera 10 is turned off, that is, since the shake correction is not performed, the CPU 60A determines that it is necessary to revolve the surveillance camera 10 using the position control, which can be controlled at the revolution speed slower than the speed control. The CPU 60A calculates the input value of the revolution command to cause the surveillance camera 10 to revolve by the position control and the output interval of the revolution command (step S318). Each piece of processing from step S318 to step S321 has the same processing content as each piece of processing of step S118 to step S121 shown in FIG. 7.

Next, the CPU 60A determines, based on the output interval calculated in step S318, whether or not a current time is a timing at which the revolution command is output (step S319). In a case where the timing at which the revolution command is output is reached (step S319: Yes), the CPU 60A outputs the revolution command including the input value calculated in step S318 to the revolution mechanism 16 (step S320). Accordingly, the surveillance camera 10 is subjected to the position control at the revolution speed decided in step S312 to revolve.

Next, the CPU 60A determines whether or not the condition for ending the revolution of the revolution mechanism 16 is satisfied (step S321). In a case where the condition for ending the revolution is not satisfied (step S321: No), the CPU 60A returns to step S319 and repeats each piece of processing of step S319 and subsequent steps. On the other hand, in step S321, in a case where the condition for ending the revolution of the revolution mechanism 16 is satisfied (step S321: Yes), the CPU 60A ends the revolution of the surveillance camera 10 in the position control.

On the other hand, in step S319, in a case where the timing at which the revolution command is output is not reached (step S319: No), the CPU 60A proceeds to step S321 and executes the processing of step S321 and subsequent steps.

As described above, in the third operation control example by the CPU 60A of the management apparatus 11, the speed control and the position control related to the operation of the revolution mechanism 16 are switched based on the state of anti-vibration control of the imaging performed by the surveillance camera 10. Accordingly, it is possible to perform the revolution control of the surveillance camera 10 at an appropriate revolution speed in accordance with the on/off state or the strong/weak state of the anti-vibration control of the imaging. That is, in a case where the anti-vibration control of the surveillance camera 10 is set to be turned off, it is possible to cause the surveillance camera 10 to revolve at a low speed necessary in a state where the anti-vibration control is not performed, using the position control. Thus, it is possible to make the captured image less likely to blur even in a case where the anti-vibration control of the surveillance camera 10 is not performed, and thus it is possible to improve the usability of the operator.

Fourth Operation Control Example

Figure 10:
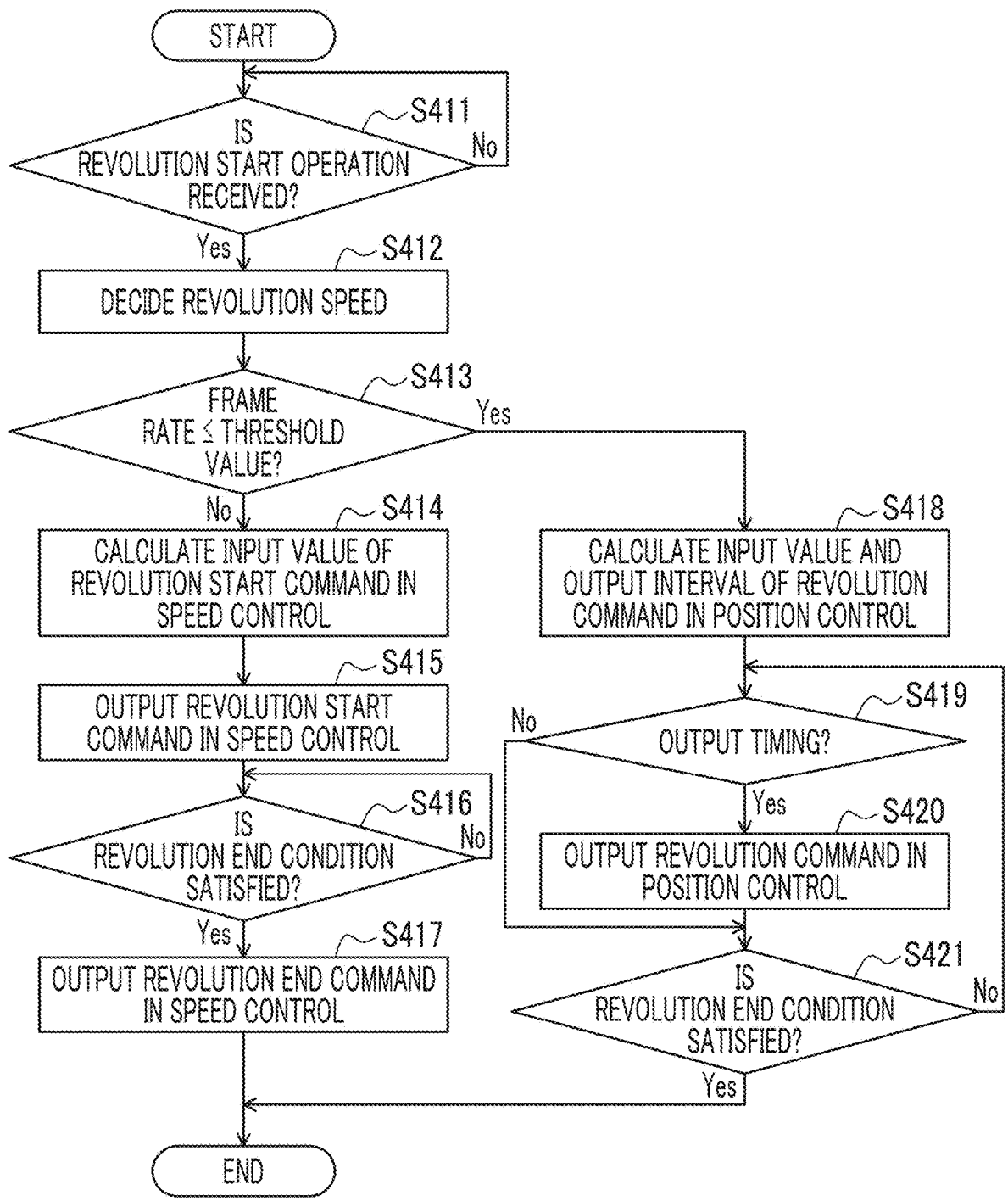
FIG. 10 is a flowchart showing a fourth operation control example of controlling the operation of the revolution mechanism 16 by the CPU 60A of the management apparatus 11.

FIG. 10 is a flowchart showing a fourth operation control example of controlling the operation of the revolution mechanism 16 by the CPU 60A of the management apparatus 11. The CPU 60A executes, for example, processing shown in FIG. 10 as the operation control of the revolution mechanism 16.

First, the CPU 60A determines whether or not the revolution start operation of starting the revolution of the surveillance camera 10 is received (step S411). Next, the CPU 60A decides the revolution speed of the surveillance camera 10 caused to revolve by the revolution mechanism 16 (step S412). Each piece of processing of step S411 and step S412 has the same processing content as each piece of processing of step S111 and step S112 shown in FIG. 7.

Next, the CPU 60A determines whether or not the frame rate currently set in the surveillance camera 10 is equal to or less than a threshold value (step S413). The operation of the management apparatus 11 by the operator can change the frame rate of the surveillance camera 10. For example, with a touch operation on a frame rate button displayed on the screen of the display 13a, it is possible to set the frame rate of the surveillance camera 10.

In step S413, in a case where the frame rate of the surveillance camera 10 is not equal to or less than the threshold value (step S413: No), the CPU 60A switches the revolution method of the surveillance camera 10 by the revolution mechanism 16 to the speed control. Since the surveillance camera 10 is set to the frame rate larger than the threshold value, that is, to a certain large number of frames of the image, the CPU 60A determines that the situation is suitable for relatively high-speed revolution. The CPU 60A calculates the input value of the revolution start command to start the revolution of the surveillance camera 10 by the speed control (step S414). Each piece of processing from step S414 to step S417 has the same processing content as each piece of processing of step S114 to step S117 shown in FIG. 7.

The CPU 60A outputs the revolution start command including the input value calculated in step S414 to the revolution mechanism 16 (step S415). Accordingly, the surveillance camera 10 is subjected to the speed control at the revolution speed decided in step S412 to revolve.

Next, the CPU 60A determines whether or not the condition for ending the revolution of the revolution mechanism 16 is satisfied (step S416). In a case where the condition for ending the revolution is not satisfied (step S416: No), the CPU 60A repeats the processing of step S416 and waits until the condition for ending the revolution is satisfied. On the other hand, in step S416, in a case where the condition for ending the revolution of the revolution mechanism 16 is satisfied (step S416: Yes), the CPU 60A outputs the revolution end command to end the revolution of the surveillance camera 10 in the speed control (step S417), and ends the present processing.

On the other hand, in step S413, in a case where the frame rate of the surveillance camera 10 is equal to or less than the threshold value (step S413: Yes), the CPU 60A switches the revolution method of the surveillance camera 10 by the revolution mechanism 16 to the position control. Since the surveillance camera 10 is set to the frame rate equal to or less than the threshold value, that is, to a certain small number of frames of the image, the CPU 60A determines that it is necessary to revolve the surveillance camera 10 using the position control, which can be controlled at the revolution speed slower than the speed control. The CPU 60A calculates the input value of the revolution command to cause the surveillance camera 10 to revolve by the position control and the output interval of the revolution command (step S418). Each piece of processing from step S418 to step S421 has the same processing content as each piece of processing of step S118 to step S121 shown in FIG. 7.

Next, the CPU 60A determines, based on the output interval calculated in step S418, whether or not a current time is a timing at which the revolution command is output (step S419). In a case where the timing at which the revolution command is output is reached (step S419: Yes), the CPU 60A outputs the revolution command including the input value calculated in step S418 to the revolution mechanism 16 (step S420). Accordingly, the surveillance camera 10 is subjected to the position control at the revolution speed decided in step S412 to revolve.

Next, the CPU 60A determines whether or not the condition for ending the revolution of the revolution mechanism 16 is satisfied (step S421). In a case where the condition for ending the revolution is not satisfied (step S421: No), the CPU 60A returns to step S419 and repeats each piece of processing of step S419 and subsequent steps. On the other hand, in step S421, in a case where the condition for ending the revolution of the revolution mechanism 16 is satisfied (step S421: Yes), the CPU 60A ends the revolution of the surveillance camera 10 in the position control.

On the other hand, in step S419, in a case where the timing at which the revolution command is output is not reached (step S419: No), the CPU 60A proceeds to step S421 and executes the processing of step S421 and subsequent steps.

As described above, in the fourth operation control example by the CPU 60A of the management apparatus 11, the speed control and the position control related to the operation of the revolution mechanism 16 are switched based on the frame rate of the imaging performed by the surveillance camera 10. Accordingly, it is possible to perform the revolution control of the surveillance camera 10 at an appropriate revolution speed in accordance with the frame rate of the imaging. That is, in a case where the frame rate of the surveillance camera 10 is set to be lower than a predetermined rate, it is possible to cause the surveillance camera 10 to revolve at a low speed necessary in a state where the frame rate is low, using the position control. Thus, it is possible to reduce the change in the display image between frames even in a case where the frame rate of the surveillance camera 10 is set to be low, and thus it is possible to improve the usability of the operator.

Fifth Operation Control Example

Figure 11:
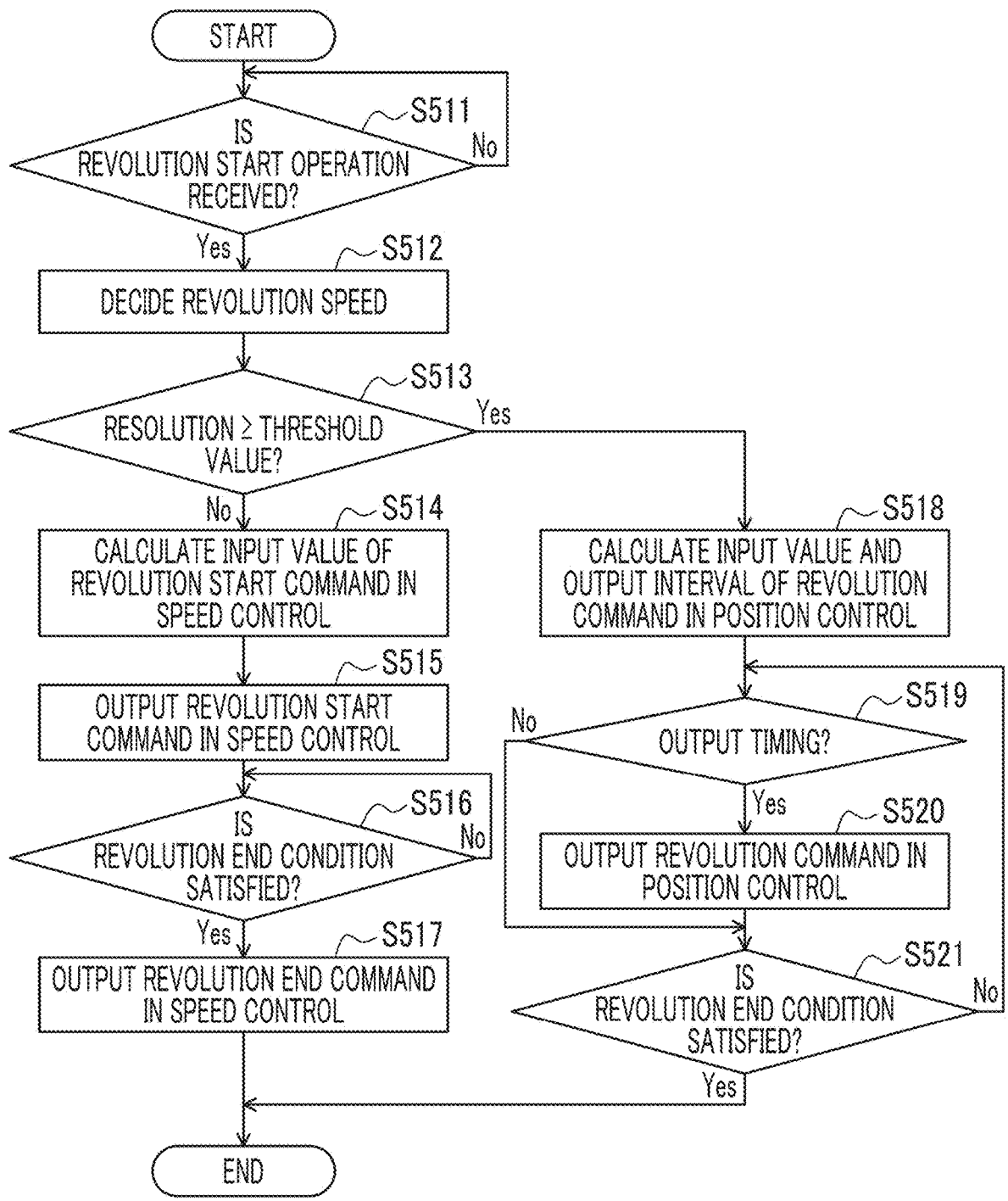
FIG. 11 is a flowchart showing a fifth operation control example of controlling the operation of the revolution mechanism 16 by the CPU 60A of the management apparatus 11.

FIG. 11 is a flowchart showing a fifth operation control example of controlling the operation of the revolution mechanism 16 by the CPU 60A of the management apparatus 11. The CPU 60A executes, for example, processing shown in FIG. 11 as the operation control of the revolution mechanism 16.

First, the CPU 60A determines whether or not the revolution start operation of starting the revolution of the surveillance camera 10 is received (step S511). Next, the CPU 60A decides the revolution speed of the surveillance camera 10 caused to revolve by the revolution mechanism 16 (step S512). Each piece of processing of step S511 and step S512 has the same processing content as each piece of processing of step S111 and step S112 shown in FIG. 7.

Next, the CPU 60A determines whether or not the resolution currently set in the surveillance camera 10 is equal to or larger than a threshold value (step S513). The resolution is, for example, the number of pixels of the captured image obtained by the imaging of the surveillance camera 10. The operation of the management apparatus 11 by the operator can change the resolution of the surveillance camera 10. For example, with a touch operation on a resolution button displayed on the screen of the display 13a, it is possible to set the resolution of the surveillance camera 10.

In step S513, in a case where the resolution of the surveillance camera 10 is not equal to or larger than the threshold value (step S513: No), the CPU 60A switches the revolution method of the surveillance camera 10 by the revolution mechanism 16 to the speed control. Since the surveillance camera 10 is set to the resolution lower than the threshold value, that is, to a certain small number of pixels, the CPU 60A determines that the situation is suitable for relatively high-speed revolution. The CPU 60A calculates the input value of the revolution start command to start the revolution of the surveillance camera 10 by the speed control (step S514). Each piece of processing from step S514 to step S517 has the same processing content as each piece of processing of step S114 to step S117 shown in FIG. 7.

The CPU 60A outputs the revolution start command including the input value calculated in step S514 to the revolution mechanism 16 (step S515). Accordingly, the surveillance camera 10 is subjected to the speed control at the revolution speed decided in step S512 to revolve.

Next, the CPU 60A determines whether or not the condition for ending the revolution of the revolution mechanism 16 is satisfied (step S516). In a case where the condition for ending the revolution is not satisfied (step S516: No), the CPU 60A repeats the processing of step S516 and waits until the condition for ending the revolution is satisfied. On the other hand, in step S516, in a case where the condition for ending the revolution of the revolution mechanism 16 is satisfied (step S516: Yes), the CPU 60A outputs the revolution end command to end the revolution of the surveillance camera 10 in the speed control (step S517), and ends the present processing.

On the other hand, in step S513, in a case where the resolution of the surveillance camera 10 is equal to or larger than the threshold value (step S513: Yes), the CPU 60A switches the revolution method of the surveillance camera 10 by the revolution mechanism 16 to the position control. Since the surveillance camera 10 is set to the resolution equal to or larger than the threshold value, that is, to a certain large number of pixels, the CPU 60A determines that a situation is required in which relatively low-speed revolution is necessary. The CPU 60A calculates the input value of the revolution command to cause the surveillance camera 10 to revolve by the position control and the output interval of the revolution command (step S518). Each piece of processing of step S518 to step S521 has the same processing content as each piece of processing of step S118 to step S121 shown in FIG. 7.

Next, the CPU 60A determines, based on the output interval calculated in step S518, whether or not a current time is a timing at which the revolution command is output (step S519). In a case where the timing at which the revolution command is output is reached (step S519: Yes), the CPU 60A outputs the revolution command including the input value calculated in step S518 to the revolution mechanism 16 (step S520). Accordingly, the surveillance camera 10 is subjected to the position control at the revolution speed decided in step S512 to revolve.

Next, the CPU 60A determines whether or not the condition for ending the revolution of the revolution mechanism 16 is satisfied (step S521). In a case where the condition for ending the revolution is not satisfied (step S521: No), the CPU 60A returns to step S519 and repeats each piece of processing of step S519 and subsequent steps. On the other hand, in step S521, in a case where the condition for ending the revolution of the revolution mechanism 16 is satisfied (step S521: Yes), the CPU 60A ends the revolution of the surveillance camera 10 in the position control.

On the other hand, in step S519, in a case where the timing at which the revolution command is output is not reached (step S519: No), the CPU 60A proceeds to step S521 and executes the processing of step S521 and subsequent steps.

As described above, in the fifth operation control example by the CPU 60A of the management apparatus 11, the speed control and the position control related to the operation of the revolution mechanism 16 are switched based on the resolution of the imaging performed by the surveillance camera 10. Accordingly, it is possible to perform the revolution control of the surveillance camera 10 at an appropriate revolution speed in accordance with the resolution of the imaging. That is, in a case where the resolution of the surveillance camera 10 is set to be higher than a predetermined value, it is possible to cause the surveillance camera 10 to revolve at a low speed necessary in a state where the resolution is high, using the position control. Thus, it is possible to reduce the change in the display image between frames even in a case where the resolution of the surveillance camera 10 is set to be high, and thus it is possible to improve the usability of the operator.

Sixth Operation Control Example

Figure 12:
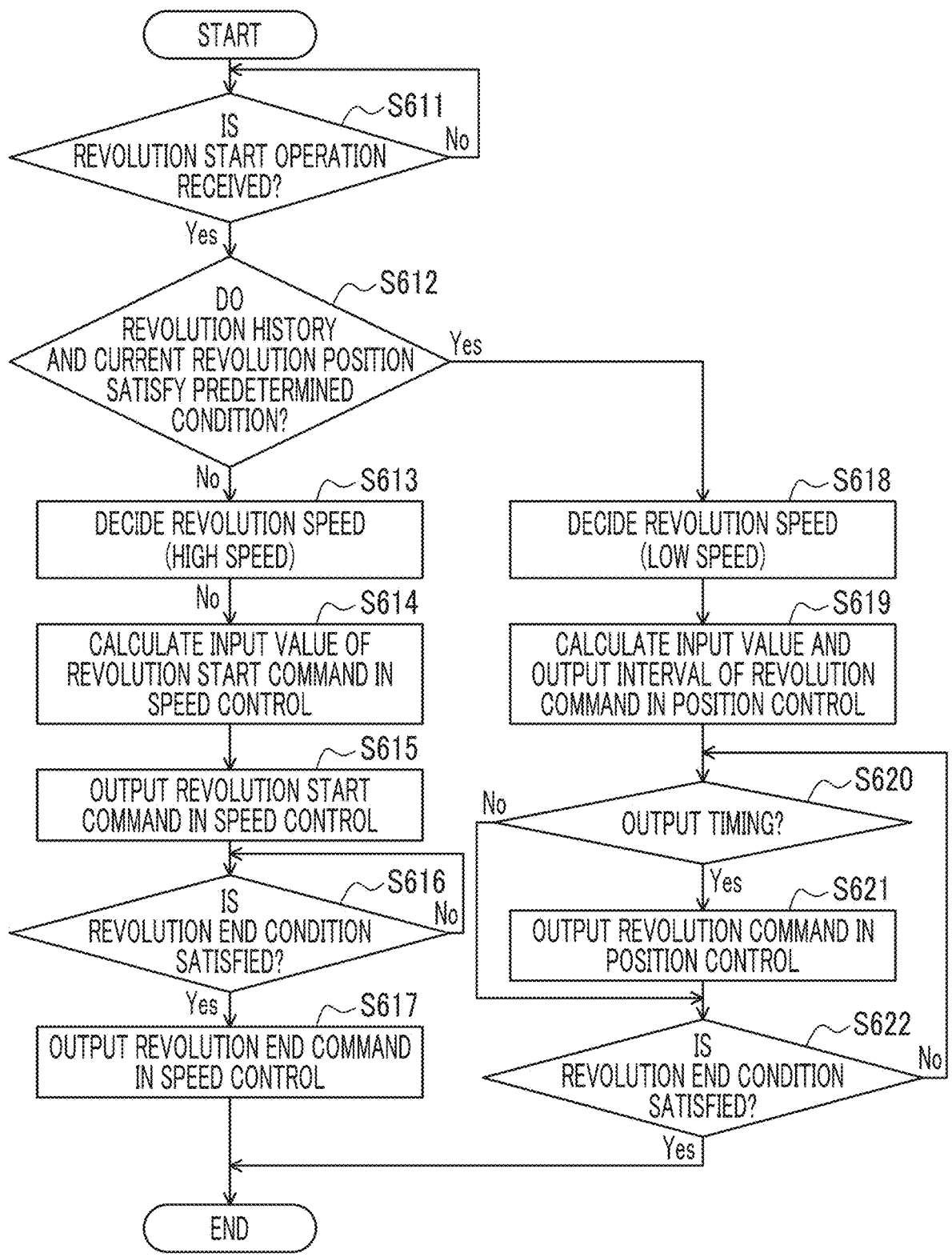
FIG. 12 is a flowchart showing a sixth operation control example of controlling the operation of the revolution mechanism 16 by the CPU 60A of the management apparatus 11.

FIG. 12 is a flowchart showing a sixth operation control example of controlling the operation of the revolution mechanism 16 by the CPU 60A of the management apparatus 11. The CPU 60A executes, for example, processing shown in FIG. 12 as the operation control of the revolution mechanism 16.

First, the CPU 60A determines whether or not the revolution start operation of starting the revolution of the surveillance camera 10 is received (step S611). The processing of step S611 has the same processing content as the processing of step S111 shown in FIG. 7.

Next, the CPU 60A determines whether or not a relationship between a current revolution position of the revolution mechanism 16 and the revolution history of the revolution mechanism 16 satisfies a predetermined condition (step S612). The predetermined condition is, for example, a case where the number of times the revolution mechanism 16 revolves by way of the current position is equal to or larger than a predetermined number of times, in a fixed period in the past (for example, one week in the past), that is, a case where a position where the revolution mechanism 16 currently revolves is a position that has been frequently monitored recently. Further, the predetermined condition may be a case where there is no history of the current position in a fixed period in the past (for example, the last one hour), that is, a case where a position where the revolution mechanism 16 currently revolves is a position that is less necessary to be monitored at the present stage.

In step S612, in a case where the relationship between the current position and the revolution history of the revolution mechanism 16 does not satisfy the predetermined condition (step S612: No), the CPU 60A decides the revolution speed of the surveillance camera 10 caused to revolve by the revolution mechanism 16 to a relatively high revolution speed (step S613). For example, the CPU 60A decides, as the revolution speed of the surveillance camera 10, the revolution speed obtained by multiplying the revolution speed (for example, the revolution speed according to the length of the arrow line 13e) decided by the revolution start operation received in step S611 by a coefficient $\alpha$. The coefficient $\alpha$ is a coefficient (one as an example) larger than a coefficient $\beta$ described below.

Next, the CPU 60A switches the revolution method of the surveillance camera 10 by the revolution mechanism 16 to speed control. Since the relationship between the current position and the revolution history of the revolution mechanism 16 does not satisfy the predetermined condition, the CPU 60A determines that the situation is suitable for relatively high-speed revolution. The CPU 60A calculates the input value of the revolution start command to start the revolution of the surveillance camera 10 by the speed control (step S614). Each piece of processing from step S614 to step S617 has the same processing content as each piece of processing of step S114 to step S117 shown in FIG. 7.

The CPU 60A outputs the revolution start command including the input value calculated in step S614 to the revolution mechanism 16 (step S615). Accordingly, the surveillance camera 10 is subjected to the speed control at the revolution speed decided in step S613 to revolve.

Next, the CPU 60A determines whether or not the condition for ending the revolution of the revolution mechanism 16 is satisfied (step S616). In a case where the condition for ending the revolution is not satisfied (step S616: No), the CPU 60A repeats the processing of step S616 and waits until the condition for ending the revolution is satisfied. On the other hand, in step S616, in a case where the condition for ending the revolution of the revolution mechanism 16 is satisfied (step S616: Yes), the CPU 60A outputs the revolution end command to end the revolution of the surveillance camera 10 in the speed control (step S617), and ends the present processing.

On the other hand, in step S612, in a case where the relationship between the current position and the revolution history of the revolution mechanism 16 satisfies the predetermined condition (step S612: Yes), the CPU 60A decides the revolution speed of the surveillance camera 10 caused to revolve by the revolution mechanism 16 (step S618). For example, the CPU 60A decides, as the revolution speed of the surveillance camera 10, the revolution speed obtained by multiplying the revolution speed (for example, the revolution speed according to the length of the arrow line 13e) decided by the revolution start operation received in step S611 by the coefficient $\beta$. The coefficient $\beta$ is a coefficient (0.5 as an example) smaller than the above-mentioned coefficient $\alpha$.

Next, the CPU 60A switches the revolution method of the surveillance camera 10 by the revolution mechanism 16 to the position control. Since the relationship between the current position and the revolution history of the revolution mechanism 16 satisfies the predetermined condition, the CPU 60A determines that the situation is suitable for relatively low-speed revolution. The CPU 60A calculates the input value of the revolution command to cause the surveillance camera 10 to revolve by the position control and the output interval of the revolution command (step S619). Each piece of processing of step S619 to step S622 has the same processing content as each piece of processing of step S118 to step S121 shown in FIG. 7.

Next, the CPU 60A determines, based on the output interval calculated in step S619, whether or not a current time is a timing at which the revolution command is output (step S620). In a case where the timing at which the revolution command is output is reached (step S620: Yes), the CPU 60A outputs the revolution command including the input value calculated in step S619 to the revolution mechanism 16 (step S621). Accordingly, the surveillance camera 10 is subjected to the position control at the revolution speed decided in step S618 to revolve.

Next, the CPU 60A determines whether or not the condition for ending the revolution of the revolution mechanism 16 is satisfied (step S622). In a case where the condition for ending the revolution is not satisfied (step S622: No), the CPU 60A returns to step S620 and repeats each piece of processing of step S620 and subsequent steps. On the other hand, in step S622, in a case where the condition for ending the revolution of the revolution mechanism 16 is satisfied (step S622: Yes), the CPU 60A ends the revolution of the surveillance camera 10 in the position control.

On the other hand, in step S620, in a case where the timing at which the revolution command is output is not reached (step S620: No), the CPU 60A proceeds to step S622 and executes the processing of step S622 and subsequent steps.

As described above, in the sixth operation control example by the CPU 60A of the management apparatus 11, the revolution speed of the revolution mechanism 16 and the control method (speed control and position control) of the revolution mechanism 16 are switched based on whether or not the relationship between the revolution history of the revolution mechanism 16 and the current revolution position of the revolution mechanism 16 satisfies the predetermined condition. Accordingly, it is possible to perform the revolution control of the surveillance camera 10 at an appropriate revolution speed in accordance with the relationship between the revolution history and the current position of the revolution mechanism 16. That is, it is possible to ensure a longer surveillance time for a part that the operator wants to carefully monitor or a part that is likely to be overlooked, and thus it is possible to improve the usability of the operator.

Modification Example of Operation Control by CPU 60A

Next, modification examples of the operation control in which the CPU 60A controls the operation of the revolution mechanism 16 will be described.

First Modification Example

Figure 13:
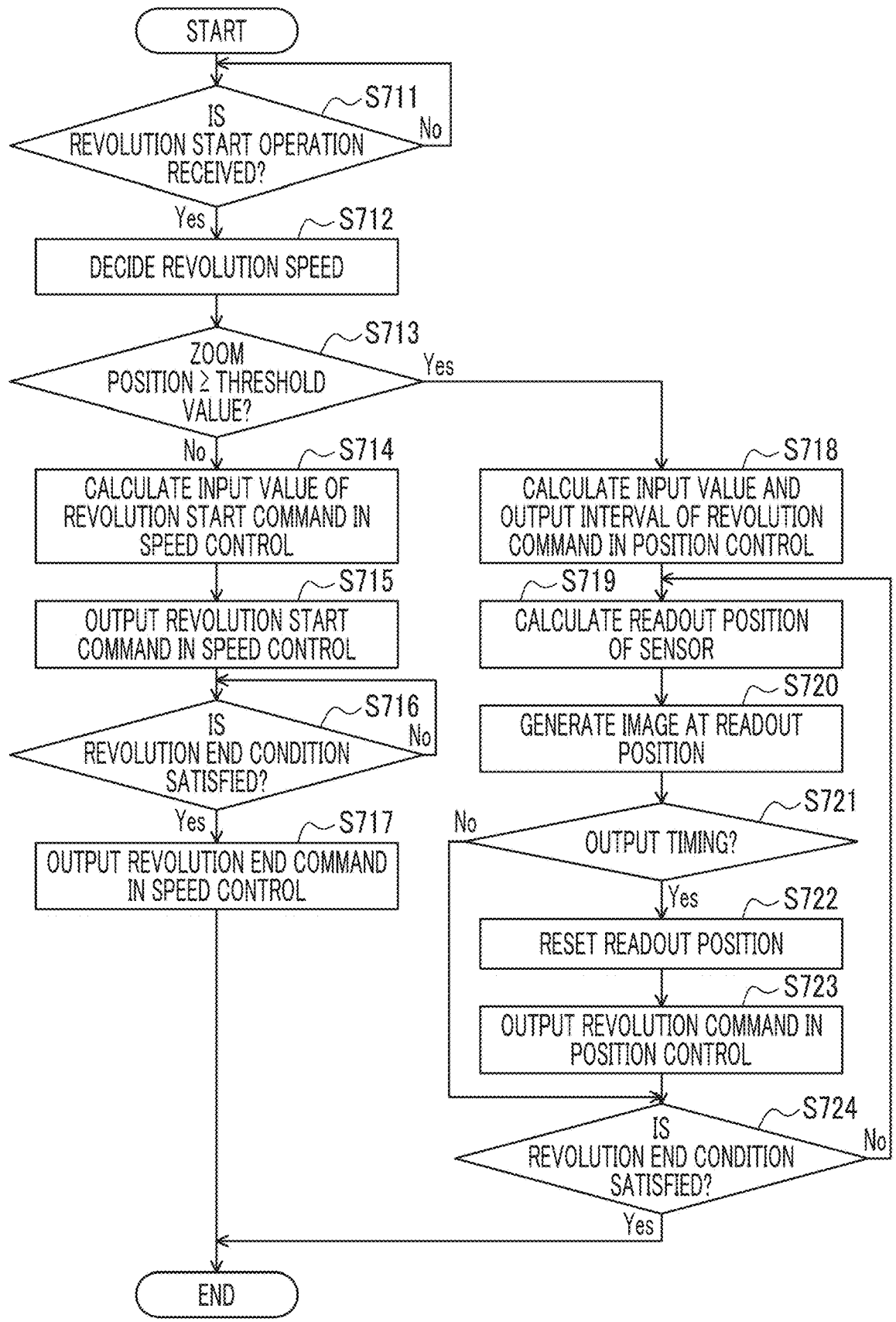
FIG. 13 is a flowchart showing a first modification example in the operation control of the revolution mechanism 16 by the CPU 60A.

A first modification example of the operation control in which the CPU 60A controls the operation of the revolution mechanism 16 will be described with reference to FIGS. 13 and 14. FIG. 13 is a flowchart showing the first modification example in the operation control of the revolution mechanism 16 by the CPU 60A. Each piece of processing of step S711 to step S718 shown in FIG. 13 has the same processing content as each piece of processing of step S111 to step S118 shown in FIG. 7.

After step S718, the CPU 60A calculates a readout position of the image read out by the surveillance camera 10 (step S719). The CPU 60A generates an image at the readout position calculated in step S719 (step S720). The generated image is displayed on the display 13a.

Figure 14:
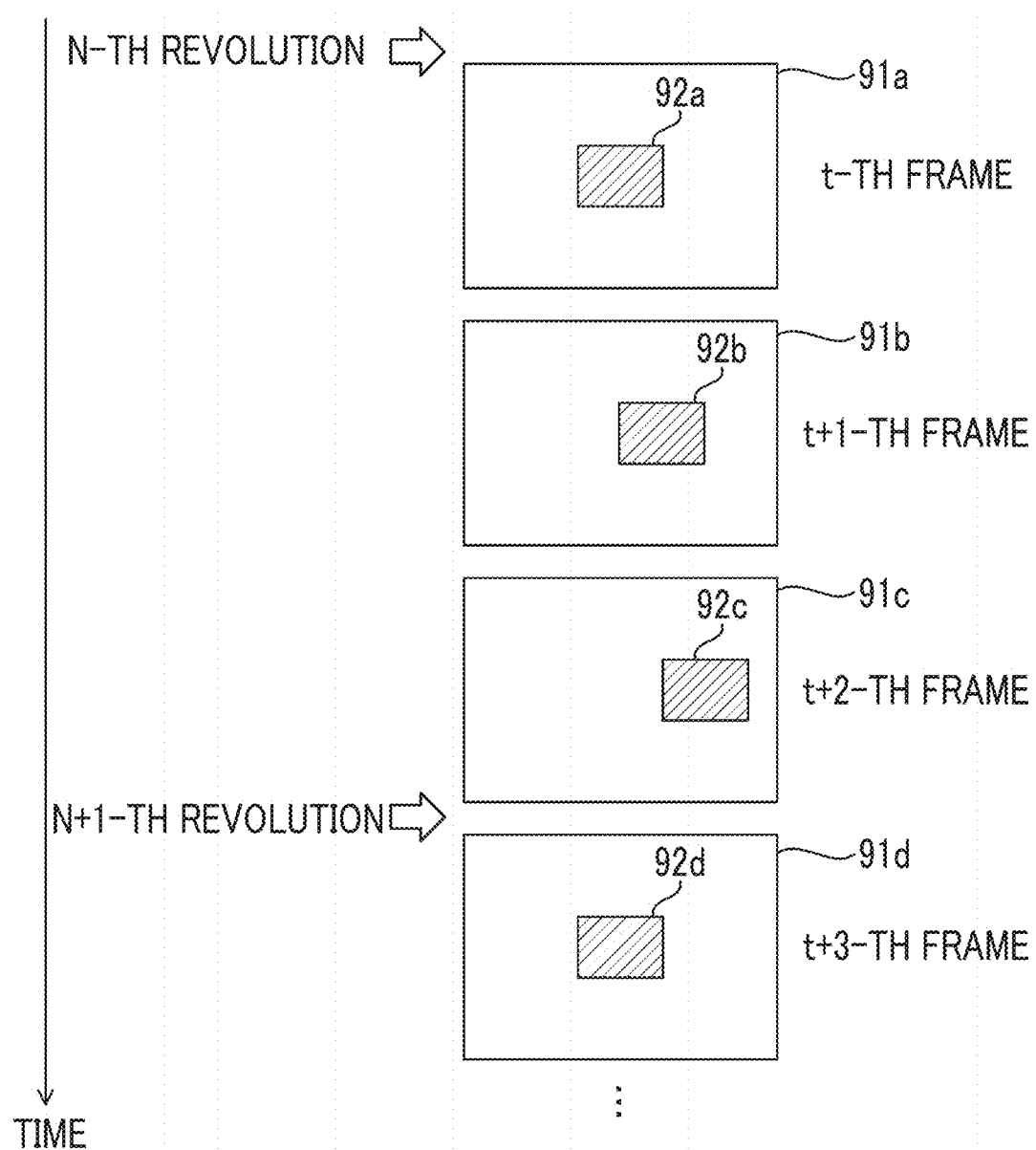
FIG. 14 is a diagram showing a readout position of an image read out by the surveillance camera 10 for each revolution command in position control.

FIG. 14 is a diagram showing the readout position of the image read out by the surveillance camera 10 for each revolution command in the position control. As shown in FIG. 14 as an example, the revolution command to cause the surveillance camera 10 to revolve is output to the surveillance camera 10 from the CPU 60A such as "N-th revolution" and "N+1-th revolution". The command of "N-th revolution" and the subsequent command of "N+1-th revolution" are output at the output interval calculated in step S718. In the example shown in FIG. 14, it is assumed that the surveillance camera 10 is in a right revolution.

In the example in FIG. 14, it is assumed that the imaging element 25 of the surveillance camera 10 performs the imaging of three frames during the discrete revolution. Captured images 91a to 91c are respective captured images (light-receiving surface 25A of the imaging element 25) that may be read out by the imaging of three frames (t-th frame, t+1-th frame, and t+2-th frame) by the surveillance camera 10 between "N-th revolution" and "N+1-th revolution". A captured image 91d is each captured image that may be read out by first imaging (t+3-th frame) in the imaging of three frames by the surveillance camera 10 between "N+1-th revolution" and "N+2-th revolution".

In a case where the position control of the revolution mechanism 16 is performed, the position control is discrete control. Thus, for example, the captured images 91a to 91c between "N-th revolution" and "N+1-th revolution" are imaging results at the same revolution position and are the same images except for the influence of blur and the like. That is, a display content of the display 13a is not changed even though the surveillance camera 10 performs the imaging of three frames between "N-th revolution" and "N+1-th revolution".

Thus, even in a case where the surveillance camera 10 performs the imaging at a high frame rate, the display content of the display 13a changes only in discrete time units of the position control. Therefore, the readout positions of the images from the imaging element 25 in the captured images of three frames, which are acquired in a case where each revolution command is received, are gradually shifted in the revolution direction (right direction) to be readout positions 92a, 92b, and 92c, for example.

Returning to the description of FIG. 13, after step S720, the CPU 60A determines whether or not a current time is a timing at which the revolution command is output, based on the output interval calculated in step S718 (step S721).

In step S721, in a case where the timing at which the revolution command is output is not reached (step S721: No), the CPU 60A determines whether or not the condition for ending the revolution of the revolution mechanism 16 is satisfied (step S724).

In step S724, in a case where the condition for ending the revolution of the revolution mechanism 16 is satisfied (step S724: Yes), the CPU 60A ends the revolution of the surveillance camera 10 in the position control.

On the other hand, in step S724, in a case where the condition for ending the revolution of the revolution mechanism 16 is not satisfied (step S724: No), the CPU 60A returns to step S719 and repeats each piece of processing of step S719 and subsequent steps.

For example, in a case of the N-th revolution command shown in FIG. 14, until a timing at which the subsequent N+1-th revolution command is output, that is, at the output interval at which the both revolution commands are output, the captured images 91a to 91c of three frames of t, t+1, and t+2 are acquired, the readout position is calculated for each of the captured images 91a to 91c, and the image at the readout position is generated.

On the other hand, in step S721, in a case where the timing at which the revolution command is output is reached (step S721: Yes), the CPU 60A resets the readout position calculated in step S719 (step S722).

For example, in a case of the N-th revolution command shown in FIG. 14, the readout positions are respectively calculated for the captured images 91a to 91c of the frames of t, t+1, and t+2, it is determined as a timing at which the generation of the images at the readout positions is completed, and the shifted readout position is reset. That is, a readout position 92d of the captured image 91d next to the captured images 91a to 91c is the same as the readout position 92a of the captured image 91a.

Next, the CPU 60A outputs the revolution command including the input value calculated in step S718 to the revolution mechanism 16 (step S723). Accordingly, the surveillance camera 10 is subjected to the position control at the revolution speed decided in step S712 to revolve.

Next, the CPU 60A proceeds to step S724 and executes the processing of step S724 and subsequent steps described above.

As described above, in the first modification example in the operation control of the revolution mechanism 16 by the CPU 60A, during the discrete revolution (for example, between the N-th revolution instruction and the N+1-th revolution instruction) by the position control, with the gradual shift of the readout position in the revolution direction by the surveillance camera 10, the image displayed on the display 13a is shifted. Accordingly, even in the position control in which the revolution command is discretely output, surveillance images of the surveillance camera 10 displayed on the display 13a can be smooth revolution images.

In the first modification example, the case has been described in which the readout position of the image from the imaging element 25 is shifted on the surveillance camera 10 side, but the technique of the present disclosure is not limited thereto. For example, the management apparatus 11 may receive an entire image of the captured images 91a to 91d captured by the surveillance camera 10, and the CPU 60A may shift respective readout positions in the entire image thereof to the readout positions 92a, 92b, 92c, and 92d on the management apparatus 11.

Second Modification Example

A second modification example of the operation control in which the CPU 60A controls the operation of the revolution mechanism 16 will be described with reference to FIGS. 15 to 18.

As shown in FIG. 1, the management apparatus 11 and the surveillance camera 10 are connected by the communication line 12. Thus, in a case where the imaging information, the captured image, and the like are transmitted and received via the communication line 12, a communication delay may occur in communication between the management apparatus 11 and the surveillance camera 10. In a case where the communication delay occurs, work efficiency of the operator who operates the revolution of the surveillance camera 10 while viewing the display 13 of the management apparatus 11 may decrease. In the second modification example, a use image region in the captured image is changed according to the communication delay amount occurring in the communication between the management apparatus 11 and the surveillance camera 10 to suppress the decrease in the work efficiency.

Figure 15:
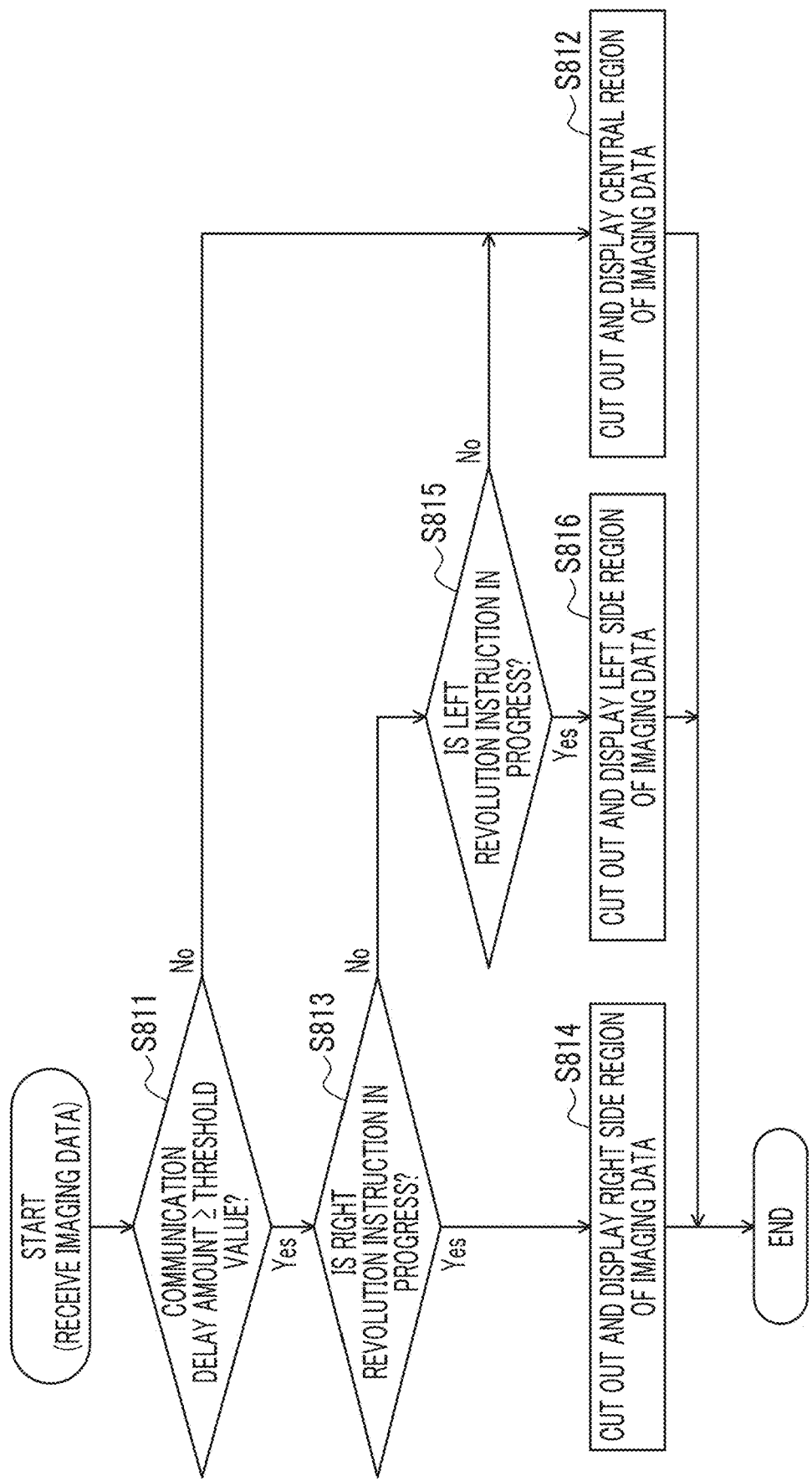
FIG. 15 is a flowchart showing a second modification example in the operation control of the revolution mechanism 16 by the CPU 60A.

FIG. 15 is a flowchart showing the second modification example in the operation control of the revolution mechanism 16 by the CPU 60A. In this example, it is assumed that the revolution that can be performed by the revolution mechanism 16 is only a right revolution and a left revolution. For example, in a case where the reception of the imaging data from the surveillance camera 10 is started, the CPU 60A starts processing shown in FIG. 15.

The CPU 60A detects the communication delay amount occurring in communication performed with the surveillance camera 10 via the communication line 12. The detection of the communication delay amount may be performed based on a response time from the surveillance camera 10 to the signal to the surveillance camera 10, or may be performed based on a communication method (such as a high-speed method or a low-speed method) between the CPU 60A and the surveillance camera 10. The CPU 60A determines whether or not the detected communication delay amount is equal to or larger than a threshold value (step S811).

In step S811, in a case where the communication delay amount is not equal to or larger than the threshold value (step S811: No), the CPU 60A cuts out a central region of the imaging data received from the surveillance camera 10 and displays the central region on the display 13a as the captured image (step S812). The processing of cutting out and displaying the imaging data is to cut out only a part of the range from the imaging data, enlarge the cutout image to, for example, a size of original imaging data, and display the enlarged image.

Figure 16:
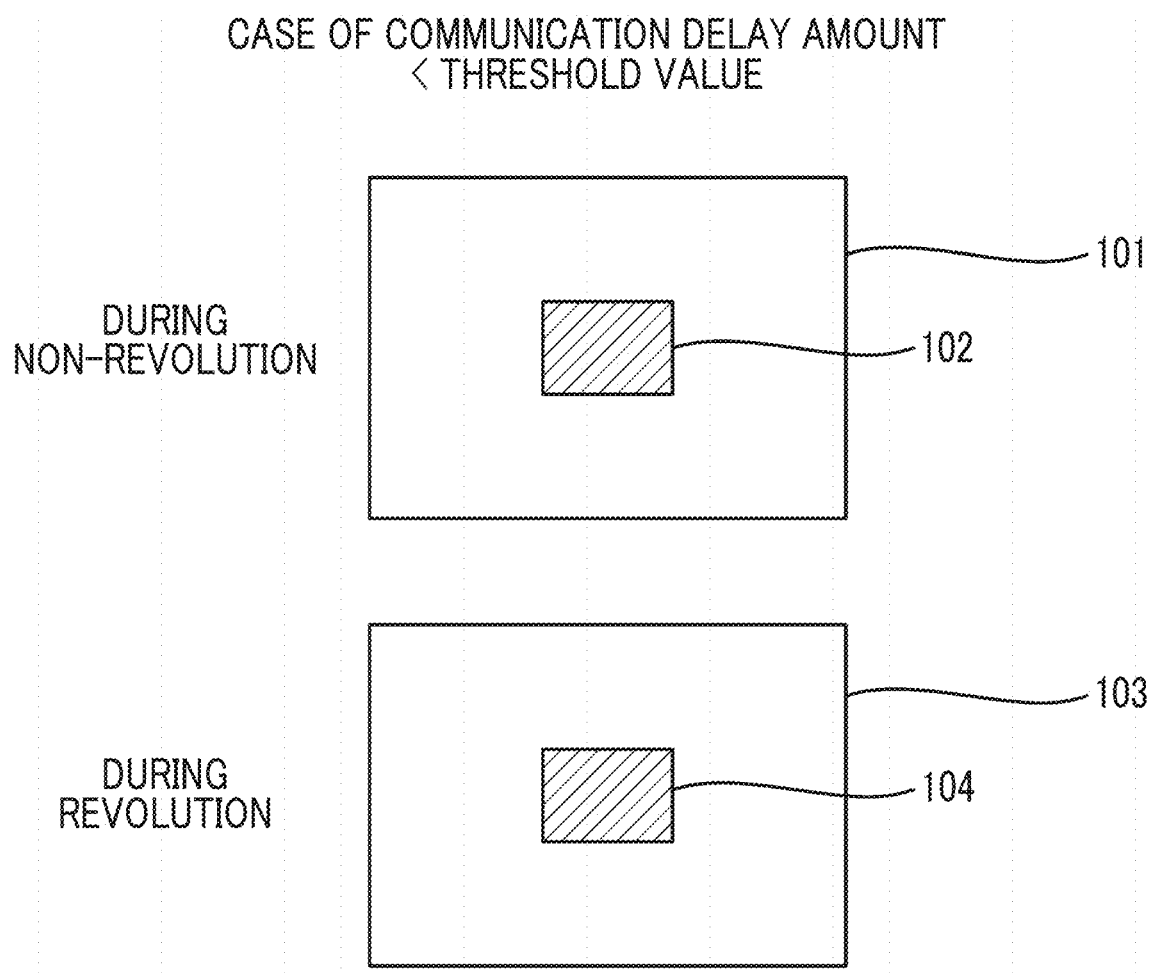
FIG. 16 is a diagram showing a cutout range in a case where a communication delay amount between the CPU 60A and the surveillance camera 10 is less than a threshold value.

FIG. 16 is a diagram showing the cutout range in the imaging data in a case where the communication delay amount between the CPU 60A and the surveillance camera 10 is less than the threshold value. As shown in FIG. 16 as an example, in a case where the communication delay amount is less than the threshold value, during non-revolution of the surveillance camera 10, the CPU 60A cuts out a central region 102 of imaging data 101 received from the surveillance camera 10 as the cutout range (display captured image) from the imaging data 101. Similarly, in a case where the communication delay amount is less than the threshold value, even during the revolution of the surveillance camera 10, the CPU 60A cuts out a central region 104 of imaging data 103 received from the surveillance camera 10 as the cutout range (display captured image) from the imaging data 103.

Returning to the description of FIG. 15, in step S811, in a case where the communication delay amount is equal to or larger than the threshold value (step S811: Yes), the CPU 60A determines whether or not the revolution mechanism 16 is in the middle of issuing the right revolution instruction to the surveillance camera 10 (the right revolution instruction is in progress) (step S813).

In step S813, in a case where the revolution mechanism 16 issues the right revolution instruction to the surveillance camera 10 (step S813: Yes), the CPU 60A cuts out a right side region of the imaging data received from the surveillance camera 10 and displays the right side region on the display 13a as the captured image (step S814).

On the other hand, in step S813, in a case where the revolution mechanism 16 does not issue the right revolution instruction to the surveillance camera 10 (step S813: No), the CPU 60A determines whether or not the revolution mechanism 16 is in the middle of issuing the left revolution instruction to the surveillance camera 10 (the left revolution instruction is in progress) (step S815).

In step S815, in a case where the revolution mechanism 16 issues the left revolution instruction to the surveillance camera 10 (step S815: Yes), the CPU 60A cuts out a left side region of the imaging data received from the surveillance camera 10 and displays the left side region on the display 13a as the captured image (step S816).

On the other hand, in step S815, in a case where the revolution mechanism 16 does not issue the left revolution instruction to the surveillance camera 10 (step S815: No), the CPU 60A proceeds to step S812 to cut out the central region of the imaging data received from the surveillance camera 10 and display the central region on the display 13a as the captured image.

Figure 17:
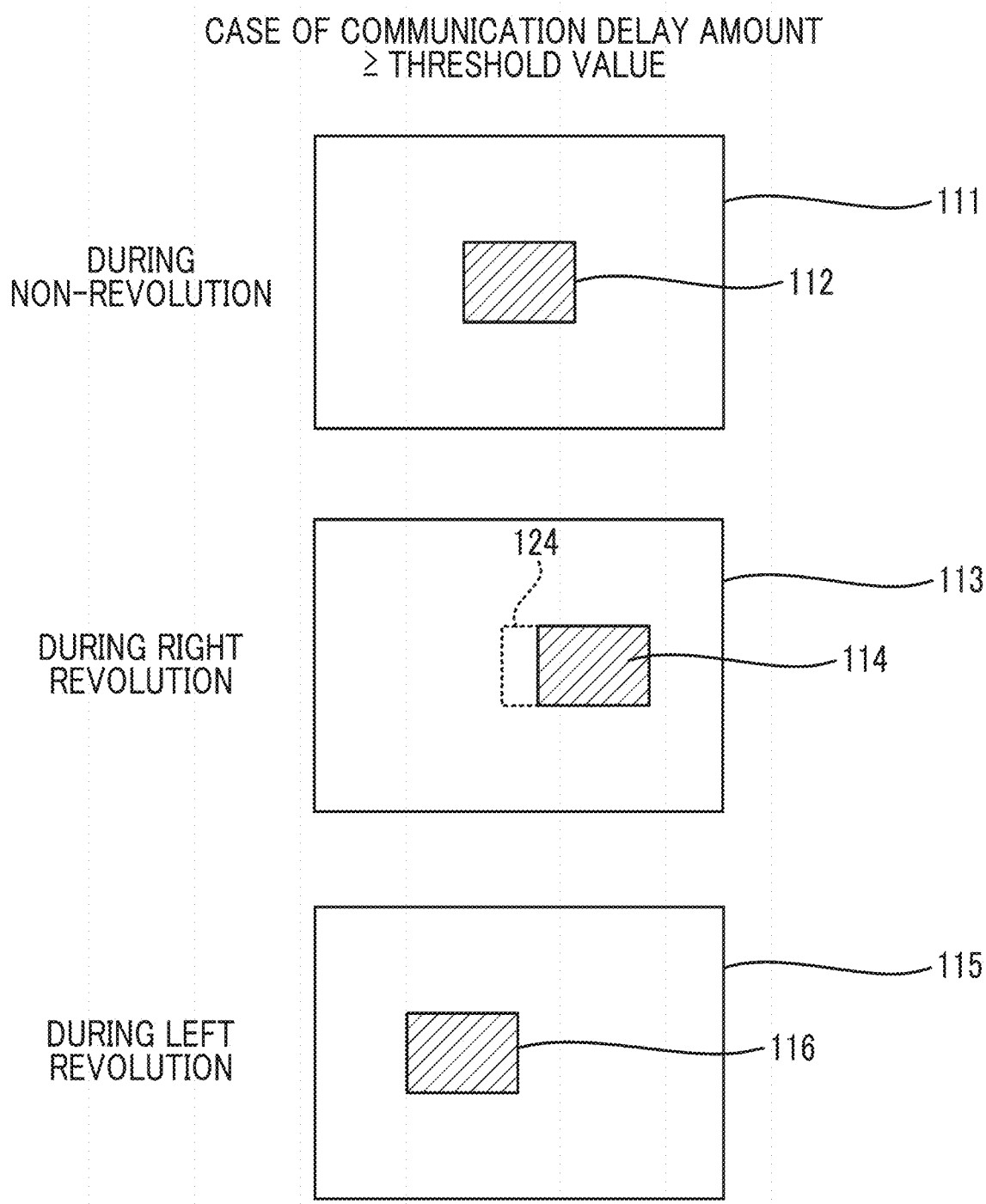
FIG. 17 is a diagram showing a cutout range in a case where the communication delay amount between the CPU 60A and the surveillance camera 10 is equal to or larger than the threshold value.

FIG. 17 is a diagram showing the cutout range in the imaging data in a case where the communication delay amount between the CPU 60A and the surveillance camera 10 is equal to or larger than the threshold value. As shown in FIG. 17 as an example, in a case where the communication delay amount is equal to or larger than the threshold value, during the non-revolution of the surveillance camera 10, as in the case where the communication delay amount is less than the threshold value, the CPU 60A cuts out a central region 112 of imaging data 111 received from the surveillance camera 10 as the cutout range (display captured image) from the imaging data 111. On the other hand, in a case where the communication delay amount is equal to or larger than the threshold value, during the right revolution of the surveillance camera 10, the CPU 60A cuts out a right side region 114 that is shifted to a right side from a center of imaging data 113 received from the surveillance camera 10 as the cutout range (display captured image) from the imaging data 113. Further, in a case where the communication delay amount is equal to or larger than the threshold value, during the left revolution of the surveillance camera 10, the CPU 60A cuts out a left side region 116 that is shifted to a left side from a center of imaging data 115 received from the surveillance camera 10 as the cutout range (display captured image) from the imaging data 115.

Furthermore, in a case where the cutout range (display captured image) in the imaging data is shifted according to the communication delay amount, the CPU 60A may perform control of adjusting a shift amount at the time of the revolution start and at the time of the revolution end by the revolution operation of the surveillance camera 10 as follows.

Figure 18:
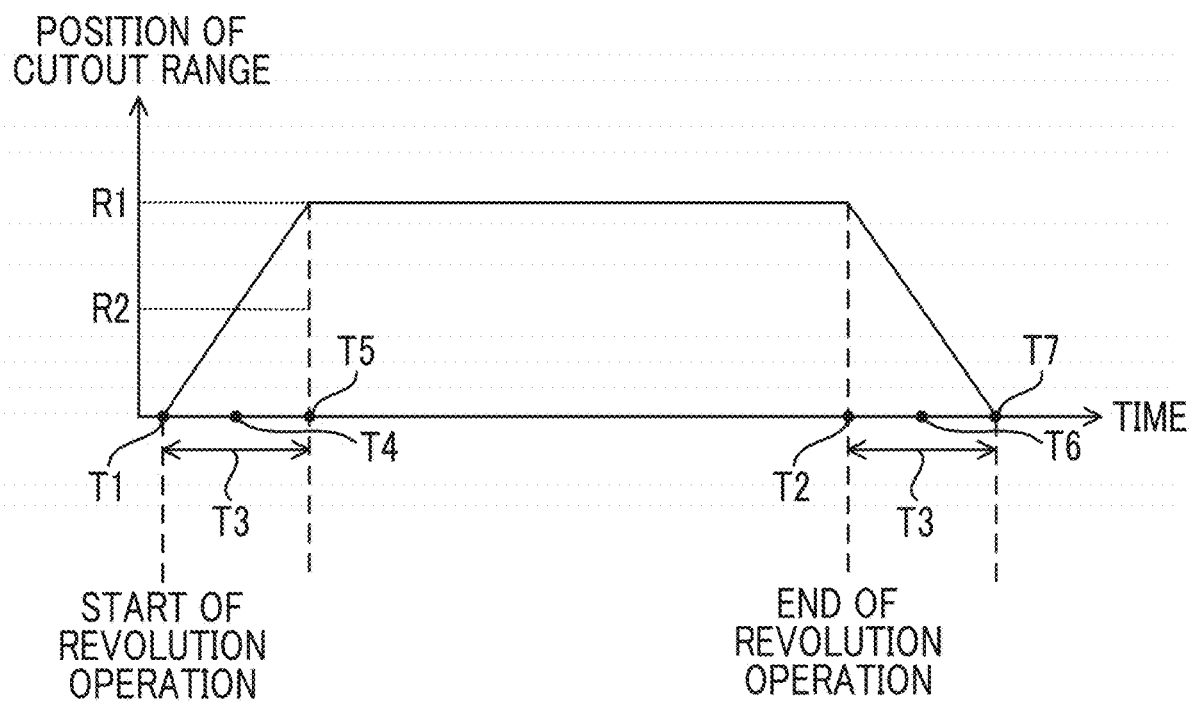
FIG. 18 is a graph showing a change in position of the cutout range in the revolution operation of the surveillance camera 10.

FIG. 18 is a graph showing a change in position of the cutout range (display captured image) in the revolution operation of the surveillance camera 10. In FIG. 18, a start time point of the revolution operation by the operator is set as a time point T1, and an end time point of the revolution operation is set as a time point T2. A delay time of the communication between the CPU 60A and the surveillance camera 10 is set as a communication delay time T3. In the present example, it is assumed that the surveillance camera 10 is in the right revolution.

In a case of the communication delay amount between the CPU 60A and the surveillance camera 10 in the present example, as shown in FIG. 18 as an example, the CPU 60A performs control of shifting the position of the cutout range (display captured image) in the imaging data to a position of a cutout range R1. However, in a case where a cutout position is largely shifted all at once to the position of the cutout range R1 at the same time as the start of the revolution operation by the operator, the image display of the display 13 may be unnatural. Thus, the shift of the cutout range is made to correspond to the communication delay time T3, and the position of the cutout range is gradually shifted during the communication delay time T3.

In a case where the change is shown in FIG. 18 in comparison with FIG. 17, at the time point T1 of the start of the revolution operation in the right revolution, the cutout range is set to be the same position as the central region 112 during the non-revolution. At a time point T4 in the middle of the elapse of the communication delay time T3, a cutout range R2 is shifted to be a position of an intermediate region 124 that is slightly shifted to the right from the central region 112. At a time point T5 at which the communication delay time T3 has elapsed, the cutout range R1 is shifted to be a position of the right side region 114.

Further, the same applies to the end of the revolution operation by the operator. In a case where the cutout position is shifted all at once to return to the same position as the central region 112 from the position of the cutout range R1 at the same time as the end of the revolution operation, the image display may be unnatural. Thus, even during the end of the revolution operation, the shift of the cutout range is made to correspond to the communication delay time T3, and the position of the cutout range is gradually shifted during the communication delay time T3.

In a case where the change is shown in FIG. 18 in comparison with FIG. 17, the position of the cutout range R1 is shifted to be the position of the right side region 114 at the time point T2 of the end of the revolution operation during the right revolution, while the position of the cutout range R2 is set to be the position of the intermediate region 124 that is slightly shifted to the right from the central region 112 at a time point T6 in the middle of the elapse of the communication delay time T3 after the end of the revolution operation. The position of the cutout range is shifted to be the same position as the central region 112 during the non-revolution at a time point T7 at which the communication delay time T3 has elapsed after the end of the revolution operation.

The control in the second modification example is executed in parallel with each piece of control in the first to sixth operation control examples and the first modification example described above. Further, the control in the second modification example may be applied to both a case of the speed control and a case of the position control.

Further, in the second modification example, the case has been described in which the revolution of the surveillance camera 10 by the revolution mechanism 16 is in the right direction and the left direction, but the technique of the present disclosure is not limited thereto. For example, the revolution of the surveillance camera 10 by the revolution mechanism 16 may include revolution in an up-down direction or an oblique direction. In this case, the CPU 60A cuts out a region closer to the up-down direction or the oblique direction of the revolution of the imaging data received from the surveillance camera 10 as the cutout range (display captured image).

As described above, in the second modification example of the operation control of the revolution mechanism 16 by the CPU 60A, with the shift of the cutout range of the CPU 60A in the imaging data in the revolution direction in accordance with the revolution of the surveillance camera 10 by the speed control or the position control, based on the communication quality (communication delay amount) between the CPU 60A of the management apparatus 11 and the revolution mechanism 16, the image displayed on the display 13a is shifted. Accordingly, even in a situation where the communication delay occurs, it is possible to suppress the apparent delay of the image displayed on the display 13 and to improve the operability of the operator.

Further, in the management apparatus 11 shown in FIG. 1, the display 13a and the secondary storage device 14 are installed at the same location, but the technique of the present disclosure is not limited thereto. For example, the display 13a and the secondary storage device 14 may be installed in a remote location. In this case, the cutout range (display captured image) to be cut out from the imaging data may be changed based on the communication delay amount occurring in communication between the display 13a and the secondary storage device 14.

Third Modification Example

A third modification example of the operation control in which the CPU 60A controls the operation of the revolution mechanism 16 will be described. In the first operation control example, a case has been described in which the revolution speed of the surveillance camera 10 caused to revolve by the revolution mechanism 16 is decided based on the length of the arrow line 13e displayed by the operation of the operator. However, the technique of the present disclosure is not limited thereto. For example, the CPU 60A may control the revolution speed at which the revolution mechanism 16 causes the surveillance camera 10 to revolve based on the angle of view of the imaging performed by the surveillance camera 10. Specifically, even in a case where the operation amount of the operator is the same, the revolution speed of the surveillance camera 10 by the revolution mechanism 16 is slower as the angle of view is narrower.

In a case where the revolution speed is changed based on the angle of view of imaging in this manner, for example, the revolution speed in step S112 of the flowchart showing the first operation control may be decided in combination with the revolution speed controlled in the third modification example. The revolution speed may be decided in combination with the revolution speed controlled in the third modification example in the same manner in the flowcharts of the second operation control to the sixth operation control. Accordingly, in a case where the surveillance camera 10 is set at the narrow angle (telephoto), it is possible to more appropriately operate the revolution amount of the surveillance camera 10, and thus it is possible to improve the usability of the operator.

Fourth Modification Example

A fourth modification example of the operation control in which the CPU 60A controls the operation of the revolution mechanism 16 will be described. The CPU 60A may control the revolution speed of the surveillance camera 10 caused to revolve by the revolution mechanism 16 based on, for example, the communication quality (communication delay amount) with the revolution mechanism 16. Specifically, the revolution speed of the surveillance camera 10 by the revolution mechanism 16 is controlled to be lower as the communication delay amount is larger.

Even in a case where the revolution speed is changed based on the communication quality as described above, the revolution speed decided by the first operation control to the sixth operation control may be decided in combination with the revolution speed controlled in the fourth modification example. Accordingly, in a case where the communication delay occurs between the CPU 60A and the revolution mechanism 16, it is possible to more appropriately operate the revolution amount of the surveillance camera 10, and thus it is possible to improve the usability of the operator.

Fifth Modification Example

In each operation control example described above, the example has been described in which the control program of each embodiment is stored in the storage 60B of the management apparatus 11 and the CPU 60A of the management apparatus 11 executes the control program in the memory 60C. However, the technique of the present disclosure is not limited thereto.

Figure 19:
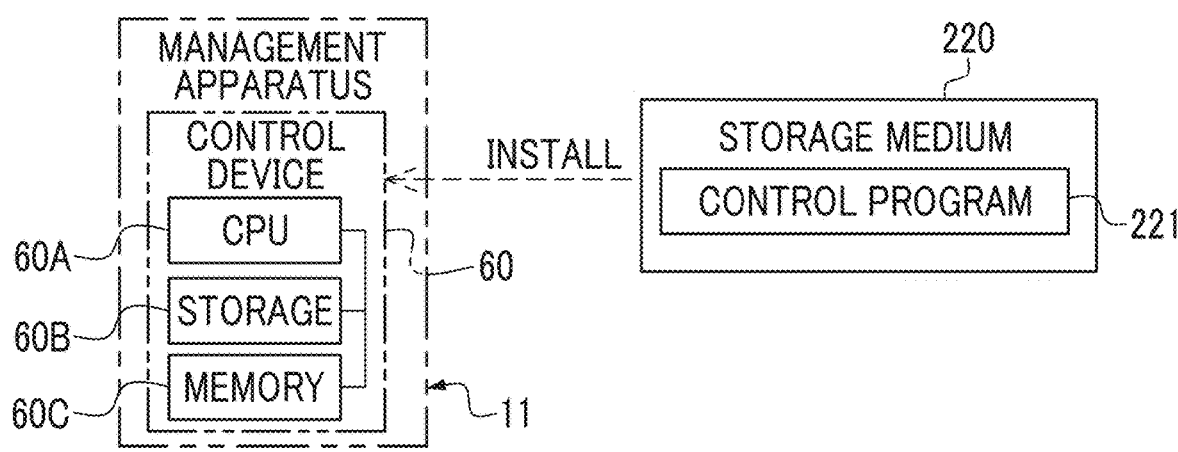
FIG. 19 is a diagram showing an example of an aspect in which a control program is installed on a control device of the management apparatus 11 from a storage medium in which the control program is stored.

FIG. 19 is a diagram showing an example of an aspect in which the control program is installed in the control device 60 of the management apparatus 11 from a storage medium in which the control program of the operation control example is stored. As shown in FIG. 19 as an example, a control program 221 may be stored in a storage medium 220 which is a non-transitory storage medium. In a case of the example shown in FIG. 19, the control program 221 stored in the storage medium 220 is installed in the control device 60, and the CPU 60A executes the revolution control or the like described above according to the control program 221.

Sixth Modification Example

In the example in FIG. 1, FIG. 5, or the like, the configuration has been described in which the main body (CPU 60A) of the management apparatus 11, the display unit (display 13a), and the operation unit (the keyboard 13b and the mouse 13c) of the management apparatus 11 are disposed at the same location. However, these may be disposed in different locations and may be connected to each other via a network. In this case, the above-described communication delay may include the communication delay between the main body (CPU 60A) of the management apparatus 11 and the display unit (display 13a), or the communication delay between the main body (CPU 60A) of the management apparatus 11 and the operation unit (the keyboard 13b and the mouse 13c).

Seventh Modification Example

In the example in FIG. 5 and the like, the configuration has been described in which the revolution mechanism 16 comprises the speed sensors 77A and 78A, or the position sensors 77B and 78B. However, the technique of the present disclosure is not limited to such a configuration. That is, the revolution mechanism 16 may be configured to perform the speed control or the position control without the feedback control of the speed or the position of the revolution.

Eighth Modification Example

The configuration has been described in which the angle of view (zoom position) of the surveillance camera 10 is variable by the zoom lens 15B2, but the technique of the present disclosure is not limited to such a configuration. For example, a configuration may be employed in which the angle of view of the surveillance camera 10 is variable by lens exchange or a digital zoom of the surveillance camera 10.

At least the following matters are described in the present specification.

(1)

A control device that controls a revolution mechanism causing an imaging apparatus to revolve, the control device comprising:
a processor,
wherein the processor is configured to switch between first control and second control related to an operation of the revolution mechanism based on at least any one of an imaging condition of the imaging apparatus or operating information of the revolution mechanism, and
the first control and the second control have different input factors for control.

(2)

A control device that controls a revolution mechanism causing an imaging apparatus to revolve, the control device comprising:
a processor,
wherein the processor is configured to switch between first control and second control related to an operation of the revolution mechanism based on at least any one of an imaging condition of the imaging apparatus or operating information of the revolution mechanism, and
the second control enables the revolution at a lower speed than in the first control.

(3)

The control device according to (1) or (2),
wherein the imaging condition includes an angle of view of imaging performed by the imaging apparatus.

(4)

The control device according to any one of (1) to (3),
wherein the imaging condition includes an exposure time of imaging performed by the imaging apparatus.

(5)

The control device according to any one of (1) to (4),
wherein the imaging condition includes a state of anti-vibration control of imaging performed by the imaging apparatus.

(6)

The control device according to any one of (1) to (5),
wherein the imaging condition includes a frame rate of imaging performed by the imaging apparatus.

(7)

The control device according to any one of (1) to (6),
wherein the imaging condition includes a resolution of imaging performed by the imaging apparatus.

(8)

The control device according to any one of (1) and (3) to (7),
wherein the input factor of the first control is a command value related to a speed, and
the input factor of the second control is a command value related to a position.

(9)

The control device according to (8),
wherein the revolution mechanism includes a sensor that detects a revolution speed of the revolution mechanism and a sensor that detects a revolution position of the revolution mechanism, and the processor is configured to acquire information about the revolution speed and the revolution position, which are detected by the sensors, to perform the first control and the second control.

(10)

The control device according to any one of (1) to (9), wherein the first control is to perform a continuous revolution, and the second control is to perform a discrete revolution.

(11)

The control device according to any one of (1) to (10), wherein the operating information of the revolution mechanism is a revolution history of the revolution mechanism, and the processor is configured to switch between the first control and the second control based on whether or not a revolution position and the revolution history of the revolution mechanism satisfy a predetermined condition.

(12)

The control device according to any one of (1) to (11), wherein an image based on imaging data obtained by the imaging apparatus is displayed on a display device, the second control is to perform a discrete revolution, and the processor is configured to perform control of shifting the image during the discrete revolution by the second control.

(13)

The control device according to any one of (1) to (12), wherein an image based on imaging data obtained by the imaging apparatus is displayed on a display device, and the processor is configured to perform control of shifting the image in accordance with the revolution by the first control or the second control based on communication quality.

(14)

The control device according to any one of (1) to (13), wherein the processor is configured to control a revolution speed of the revolution mechanism based on an angle of view of imaging performed by the imaging apparatus.

(15)

The control device according to any one of (1) to (14), wherein the processor is configured to control a revolution speed of the revolution mechanism based on communication quality.

(16)

The control device according to (13) or (15), wherein the communication quality is communication quality between the imaging apparatus and the control device.

(17)

The control device according to any one of (1) to (16), wherein the processor is configured to control a revolution speed of the revolution mechanism based on a revolution history of the revolution mechanism.

(18)

A control method executed by a processor of a control device that controls a revolution mechanism causing an imaging apparatus to revolve, the method comprising:

switching between first control and second control related to an operation of the revolution mechanism based on at least any one of an imaging condition of the imaging apparatus or operating information of the revolution mechanism, wherein the first control and the second control have different input factors for control.

(19)

A control program causing a processor of a control device, which controls a revolution mechanism causing an imaging apparatus to revolve, to execute a process comprising:

switching between first control and second control related to an operation of the revolution mechanism based on at least any one of an imaging condition of the imaging apparatus or operating information of the revolution mechanism, wherein the first control and the second control have different input factors for control.

Various embodiments have been described above, but it goes without saying that the present invention is not limited to such examples. It is apparent that those skilled in the art may perceive various modification examples or correction examples within the scope disclosed in the claims, and those examples are also understood as falling within the technical scope of the present invention. Further, any combination of various components in the embodiment may be used without departing from the gist of the invention.

The present application is based on Japanese Patent Application (JP2021-209514) filed on Dec. 23, 2021, the content of which is incorporated in the present application by reference.

EXPLANATION OF REFERENCES

1: imaging system
10: surveillance camera
11: management apparatus
12: communication line
13a: display
13b: keyboard
13c: mouse
14: secondary storage device
15: optical system
15B: lens group
15B1: anti-vibration lens
15B2: zoom lens
16: revolution mechanism
25: imaging element
25A: light-receiving surface
29: lens-side shake correction mechanism
31: DSP
32: image memory
33: electronic shake correction unit
34, 66 to 68, 79, 80: communication I/F
35, 60C: memory
36, 60B: storage
37, 60A: CPU
38, 70: bus
40: shake amount detection sensor
43: UI system device
43A, 62: reception device
45: imaging element-side shake correction mechanism
60: control device
71: yaw-axis revolution mechanism
72: pitch-axis revolution mechanism
73, 74: motor
75, 76: driver
77A, 78A: speed sensor
77B, 78B: position sensor

What is claimed is:

1. A control device that controls a revolution mechanism causing an imaging apparatus to revolve, the control device comprising:
a processor,
wherein the processor is configured to switch between first control and second control that are related to an operation of the revolution mechanism based on at least any one of an imaging condition of the imaging apparatus or operating information of the revolution mechanism,
the first control is continuous control in which an input factor is a command value of a speed, and
the second control is discrete control in which the input factor is a command value of a position,
wherein the processor is configured to control a revolution speed of the revolution mechanism based on communication quality.

2. The control device according to claim 1, wherein the imaging condition includes an angle of view of imaging performed by the imaging apparatus.

3. The control device according to claim 1, wherein the imaging condition includes an exposure time of imaging performed by the imaging apparatus.

4. The control device according to claim 1, wherein the imaging condition includes a state of anti-vibration control of imaging performed by the imaging apparatus.

5. The control device according to claim 1, wherein the imaging condition includes a frame rate of imaging performed by the imaging apparatus.

6. The control device according to claim 1, wherein the imaging condition includes a resolution of imaging performed by the imaging apparatus.

7. The control device according to claim 1, wherein the revolution mechanism includes a sensor that detects the revolution speed of the revolution mechanism and a sensor that detects a revolution position of the revolution mechanism, and
the processor is configured to acquire information about the revolution speed and the revolution position, which are detected by the sensors, to perform the first control and the second control.

8. The control device according to claim 1, wherein the first control is to perform a continuous revolution, and
the second control is to perform a discrete revolution.

9. The control device according to claim 1, wherein the operating information of the revolution mechanism is a revolution history of the revolution mechanism, and
the processor is configured to switch between the first control and the second control based on whether or not a revolution position and the revolution history of the revolution mechanism satisfy a predetermined condition.

10. The control device according to claim 1, wherein an image based on imaging data obtained by the imaging apparatus is displayed on a display device,
the second control is to perform a discrete revolution, and
the processor is configured to perform control of shifting the image during the discrete revolution by the second control.

11. The control device according to claim 1, wherein an image based on imaging data obtained by the imaging apparatus is displayed on a display device, and
the processor is configured to perform control of shifting the image in accordance with the revolution by the first control or the second control based on the communication quality.

12. The control device according to claim 11, wherein the communication quality is communication quality between the imaging apparatus and the control device.

13. The control device according to claim 1, wherein the processor is configured to control the revolution speed of the revolution mechanism based on an angle of view of imaging performed by the imaging apparatus.

14. The control device according to claim 1, wherein the processor is configured to control the revolution speed of the revolution mechanism based on a revolution history of the revolution mechanism.

15. A control device that controls a revolution mechanism causing an imaging apparatus to revolve, the control device comprising:
a processor,
wherein the processor is configured to switch between first control and second control that are related to an operation of the revolution mechanism based on at least any one of an imaging condition of the imaging apparatus or operating information of the revolution mechanism, and
the second control enables the revolution at a lower speed than in the first contrl,
wherein the processor is configured to control a revolution speed of the revolution mechanism based on communication quality.

16. A control method executed by a processor of a control device that controls a revolution mechanism causing an imaging apparatus to revolve, the control method comprising:
switching between first control and second control that are related to an operation of the revolution mechanism based on at least any one of an imaging condition of the imaging apparatus or operating information of the revolution mechanism,
the first control is continuous control in which an input factor is a command value of a speed, and
the second control is discrete control in which the input factor is a command value of a position; and
controlling a revolution speed of the revolution mechanism based on communication quality.

17. A non-transitory computer-readable medium storing a control program causing a processor of a control device, which controls a revolution mechanism causing an imaging apparatus to revolve, to execute a process comprising:
switching between first control and second control that are related to an operation of the revolution mechanism based on at least any one of an imaging condition of the imaging apparatus or operating information of the revolution mechanism,
the first control is continuous control in which an input factor is a command value of a speed, and
the second control is discrete control in which the input factor is a command value of a position; and
controlling a revolution speed of the revolution mechanism based on communication quality.

18. A control device that controls a revolution mechanism causing an imaging apparatus to revolve, the control device comprising:

a processor, wherein the processor is configured to switch between first control and second control that are related to an operation of the revolution mechanism based on at least any one of an imaging condition of the imaging apparatus or operating information of the revolution mechanism, and the second control enables the revolution at a lower speed than in the first control, wherein an image based on imaging data obtained by the imaging apparatus is displayed on a display device, and the processor is configured to perform control of shifting the image in accordance with the revolution by the first control or the second control based on communication quality.

* * * * *